United States Patent
Tahara et al.

(10) Patent No.: US 11,237,179 B2
(45) Date of Patent: Feb. 1, 2022

(54) CALIBRATION CURVE GENERATING METHOD AND AUTOMATIC ANALYZING APPARATUS

(71) Applicant: Canon Medical Systems Corporation, Otawara (JP)

(72) Inventors: Hirotoshi Tahara, Nasushiobara (JP); Tetsuya Higashi, Nasushiobara (JP); Tomoaki Kurano, Nasushiobara (JP); Satoshi Matsumoto, Nasushiobara (JP); Yusaku Aizawa, Utsunomiya (JP)

(73) Assignee: Canon Medical Systems Corporation, Otawara (JP)

( * ) Notice: Subject to any disclaimer, the term of this patent is extended or adjusted under 35 U.S.C. 154(b) by 130 days.

(21) Appl. No.: 16/176,457

(22) Filed: Oct. 31, 2018

(65) Prior Publication Data

US 2019/0128907 A1    May 2, 2019

(30) Foreign Application Priority Data

Oct. 31, 2017  (JP) ............................. JP2017-210278
Oct. 26, 2018  (JP) ............................. JP2018-201939

(51) Int. Cl.
| | |
|---|---|
| *G01N 35/00* | (2006.01) |
| *G01N 21/78* | (2006.01) |
| *G01N 21/27* | (2006.01) |
| *G01N 21/77* | (2006.01) |
| *G01N 35/02* | (2006.01) |

(52) U.S. Cl.
CPC ..... *G01N 35/00693* (2013.01); *G01N 21/272* (2013.01); *G01N 21/274* (2013.01); *G01N 21/78* (2013.01); *G01N 35/025* (2013.01); *G01N 2021/7783* (2013.01); *G01N 2035/0097* (2013.01)

(58) Field of Classification Search
None
See application file for complete search history.

(56) References Cited

U.S. PATENT DOCUMENTS 4,313,929 A * 2/1982 Morita ............. G01N 33/54313
436/531
2016/0195522 A1  7/2016 Takahashi et al.

FOREIGN PATENT DOCUMENTS

JP            6104746        3/2017
WO    WO 2014/192963 A1   12/2014

* cited by examiner

*Primary Examiner* — Xiaoyun R Xu
(74) *Attorney, Agent, or Firm* — Oblon, McClelland, Maier & Neustadt, L.L.P.

(57) ABSTRACT

According to one embodiment, a method is for generating a calibration curve based on results of photometry on a plurality of standard samples each containing a detection target in a known concentration. The concentration differs between the standard samples. The method includes obtaining the results of photometry on the standard samples at different photometry timings, to generate the calibration curve.

5 Claims, 19 Drawing Sheets

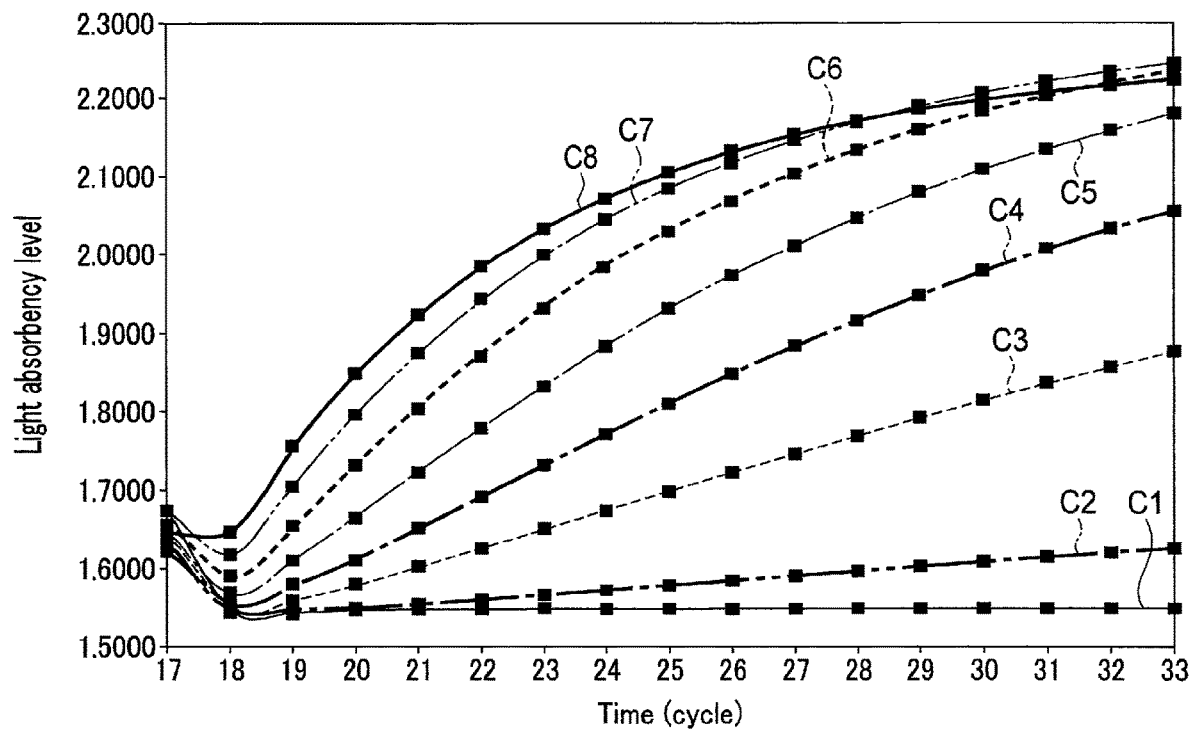
F I G. 4
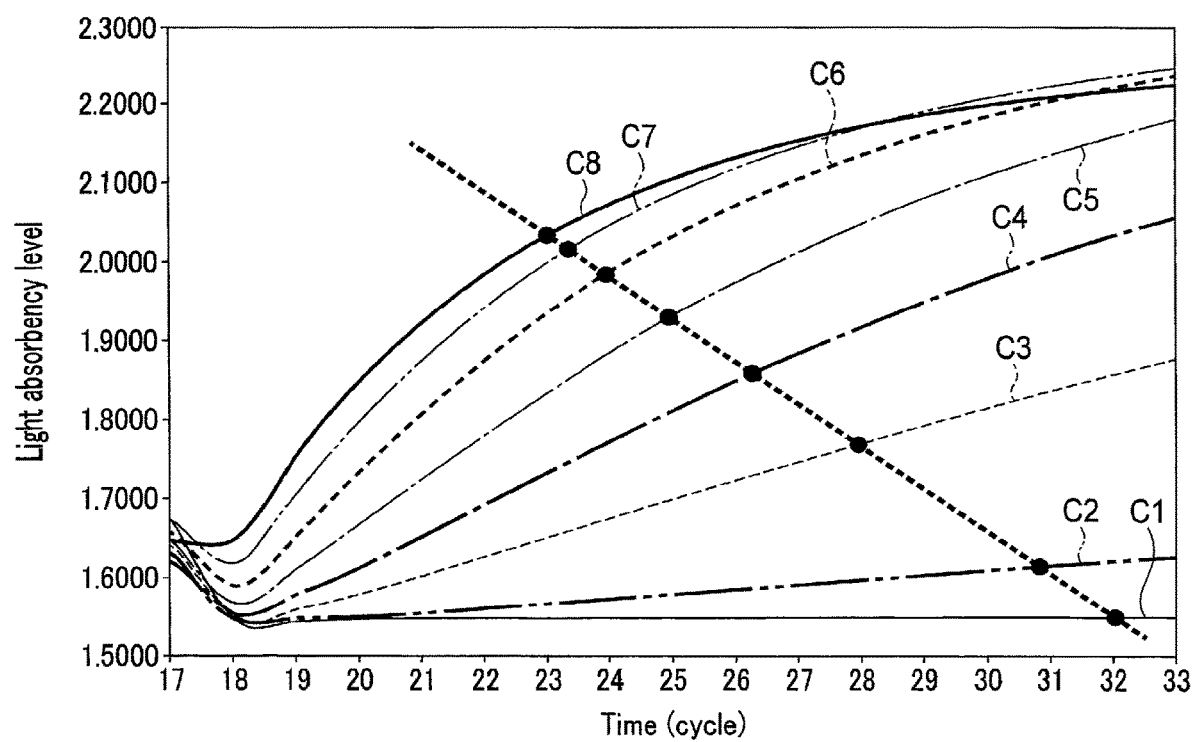
F I G. 5

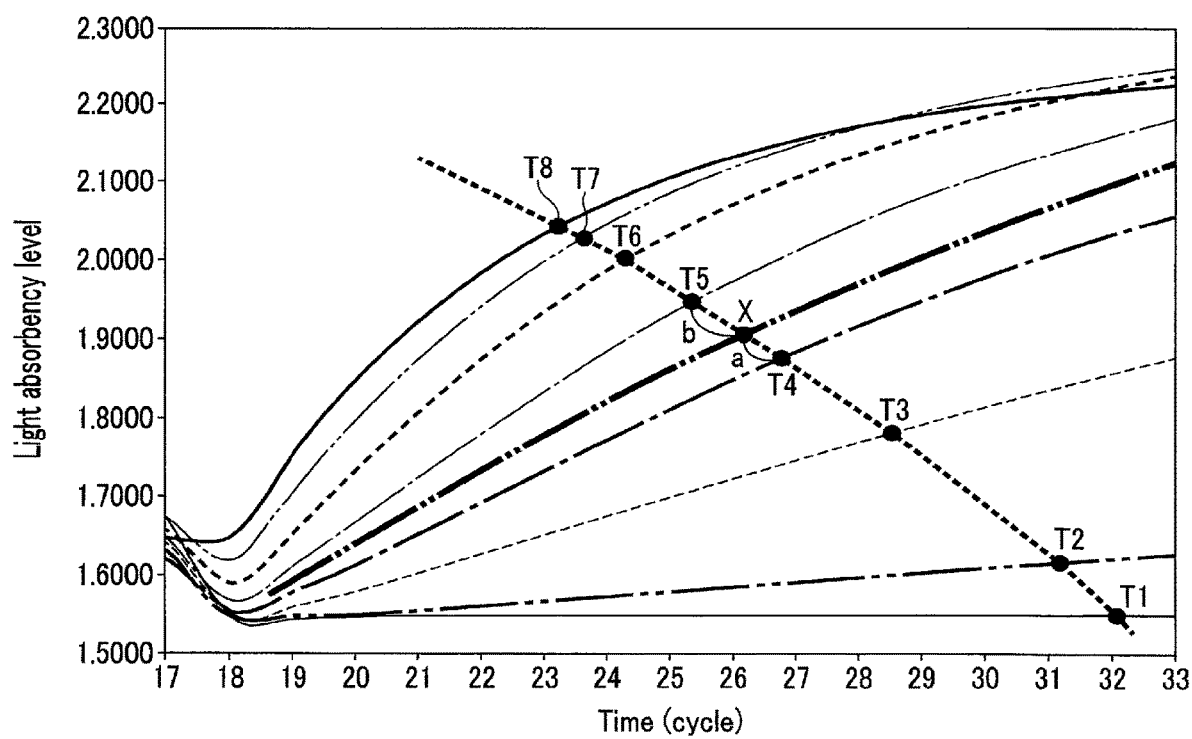
F I G. 11

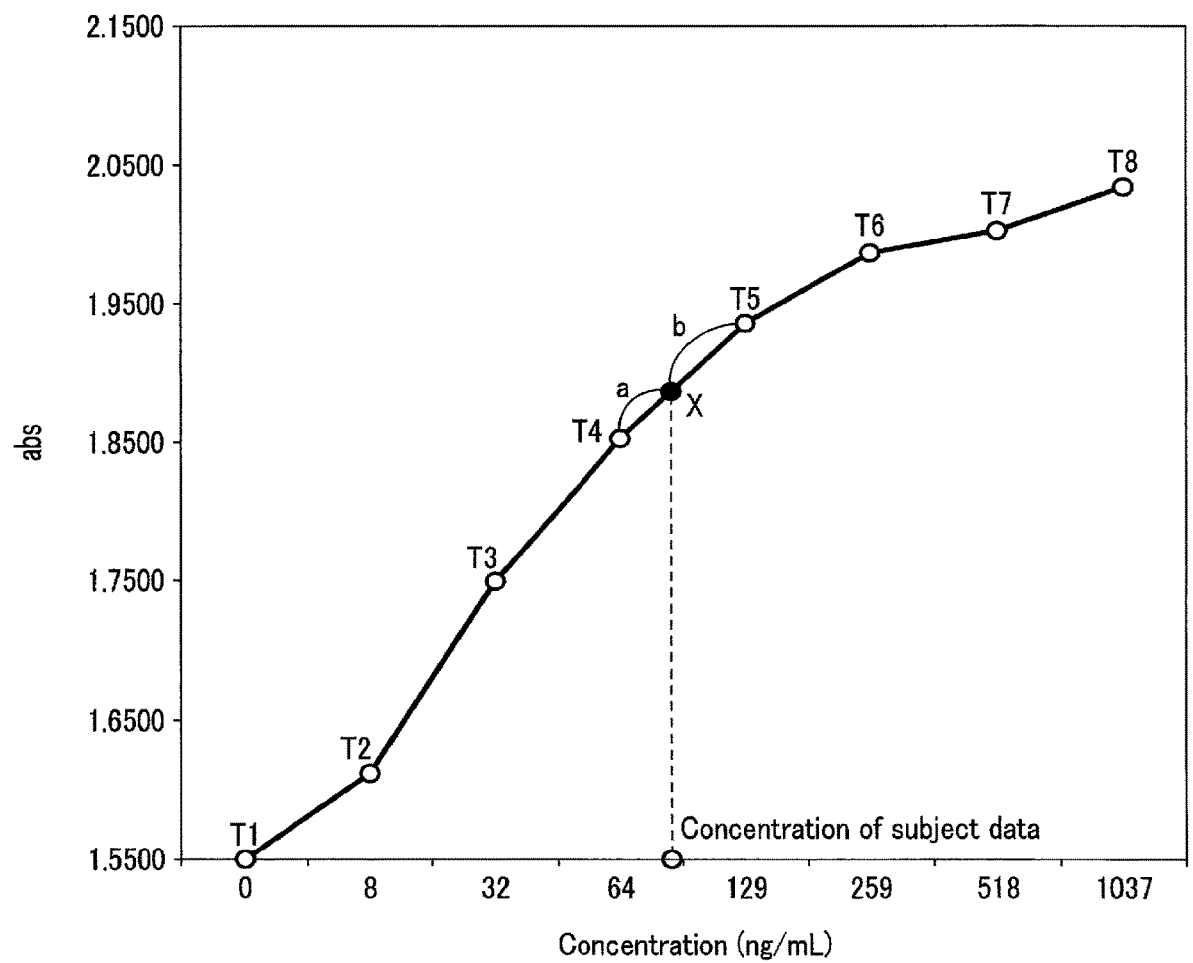
F I G. 12

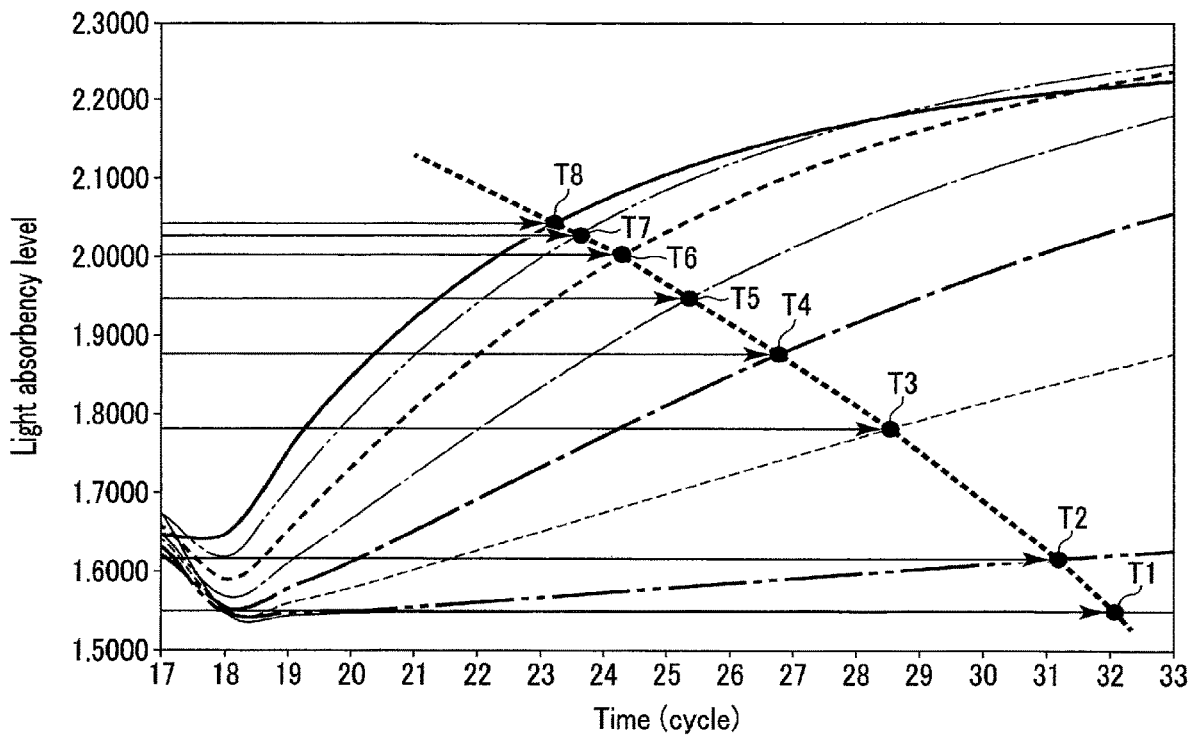
F I G. 13
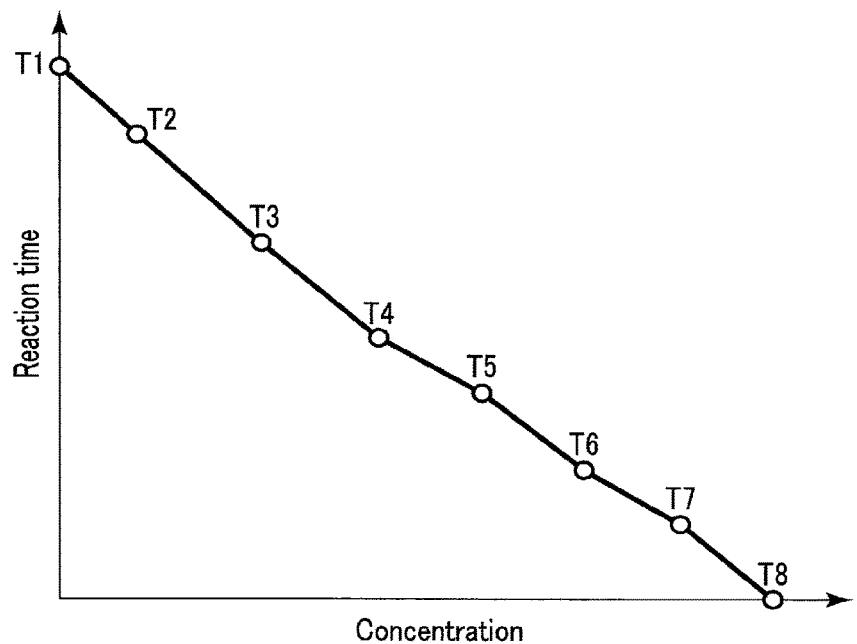
F I G. 14

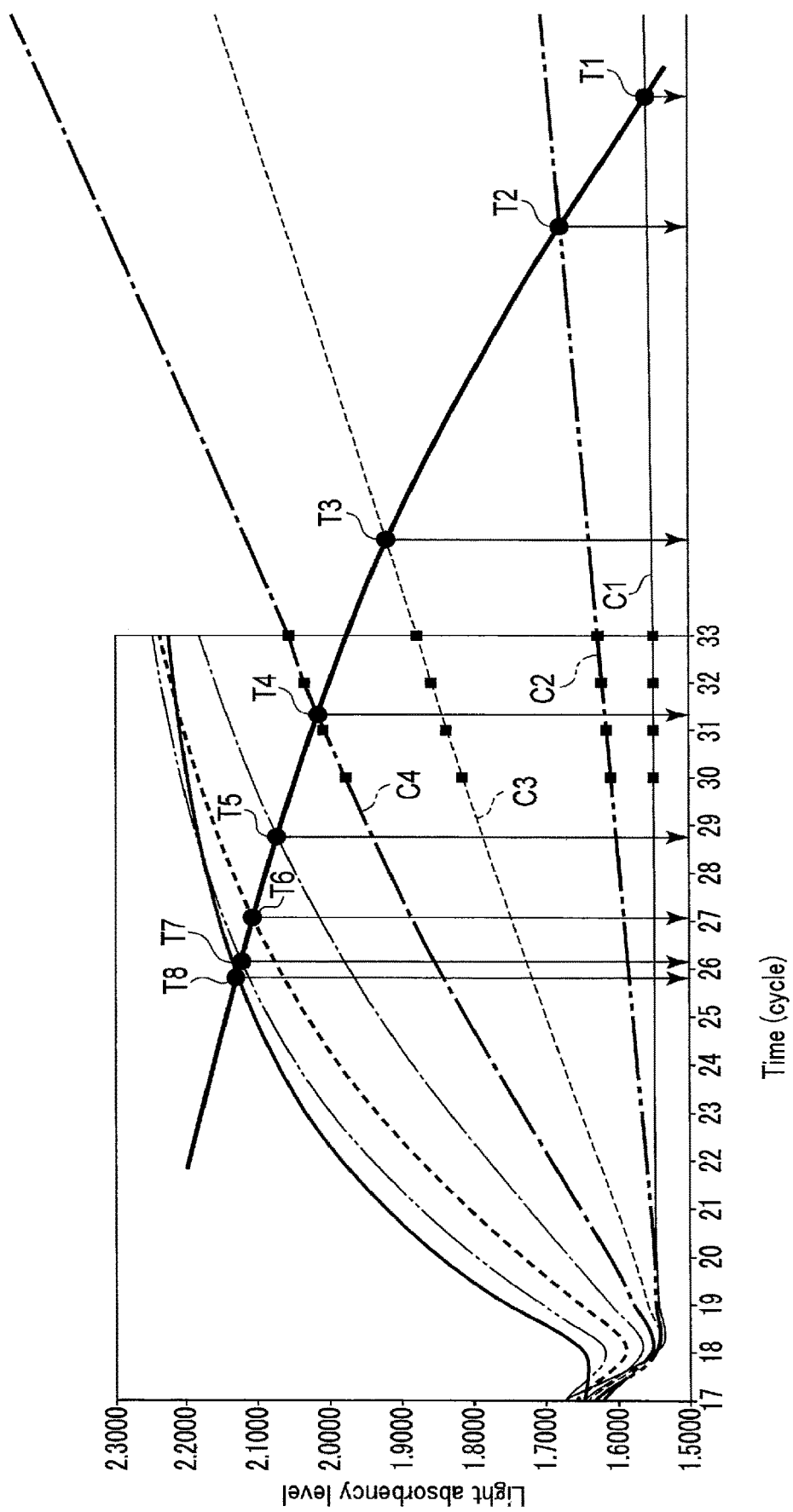
F I G. 15

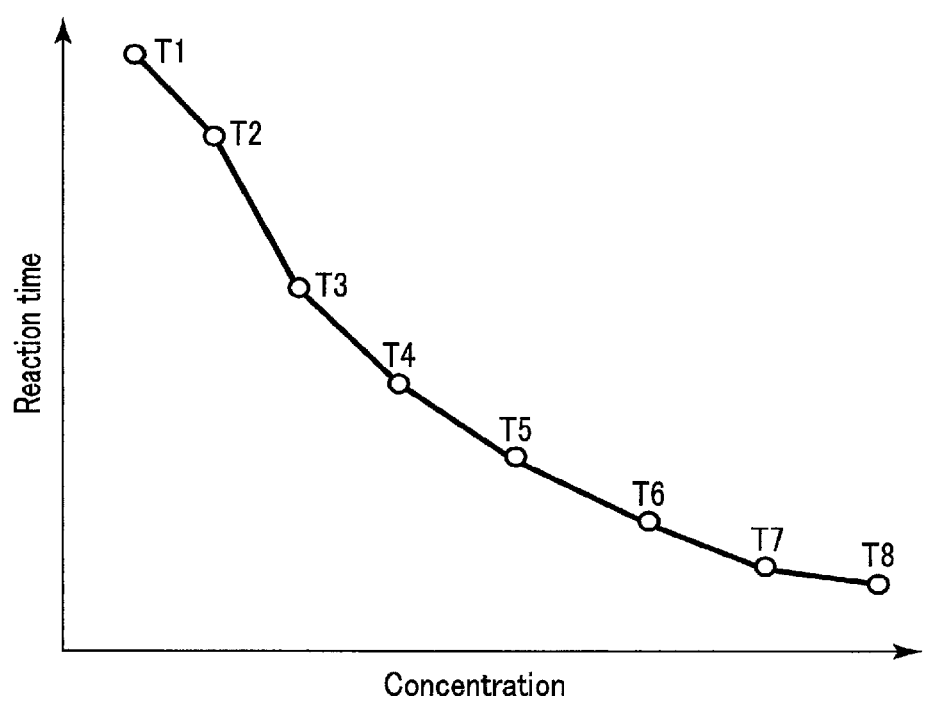
F I G. 16

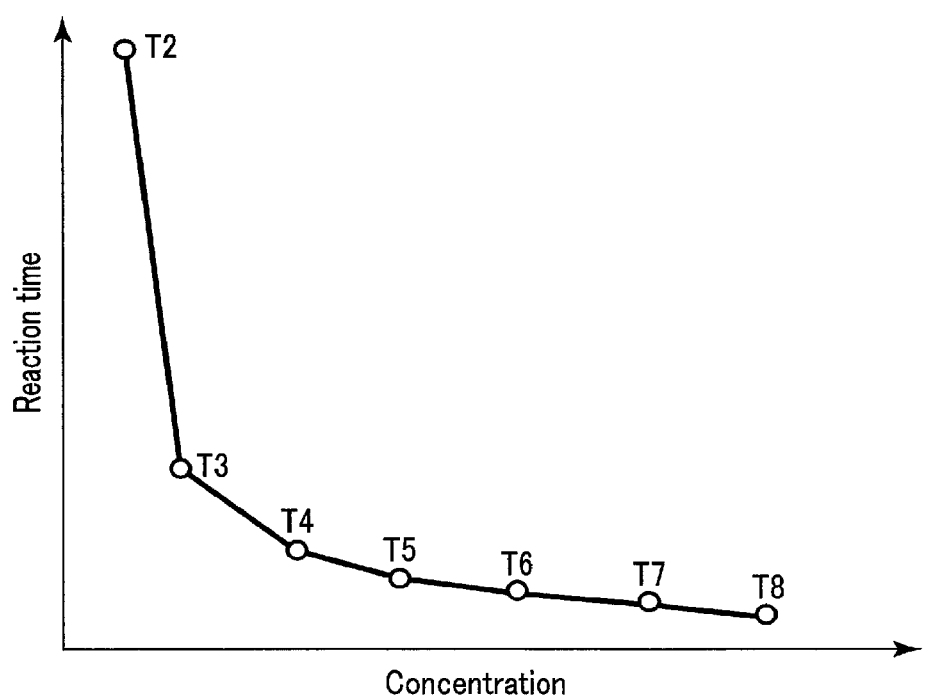
F I G. 18

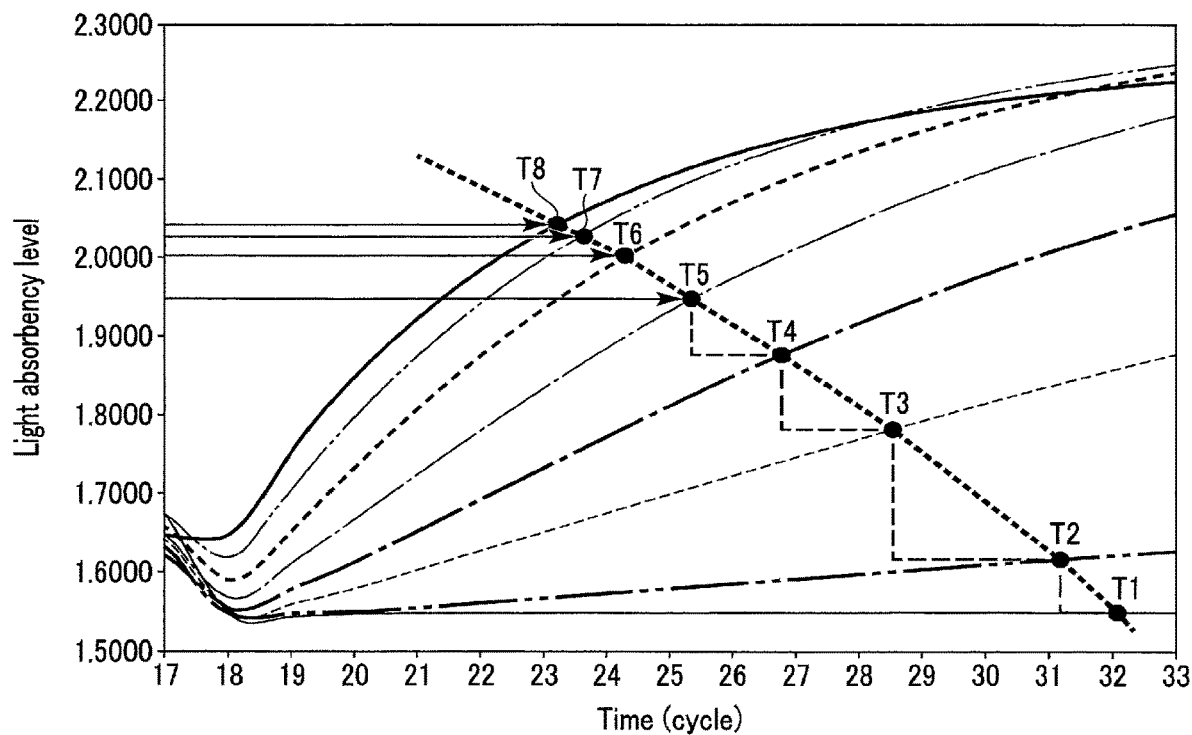
F I G. 19
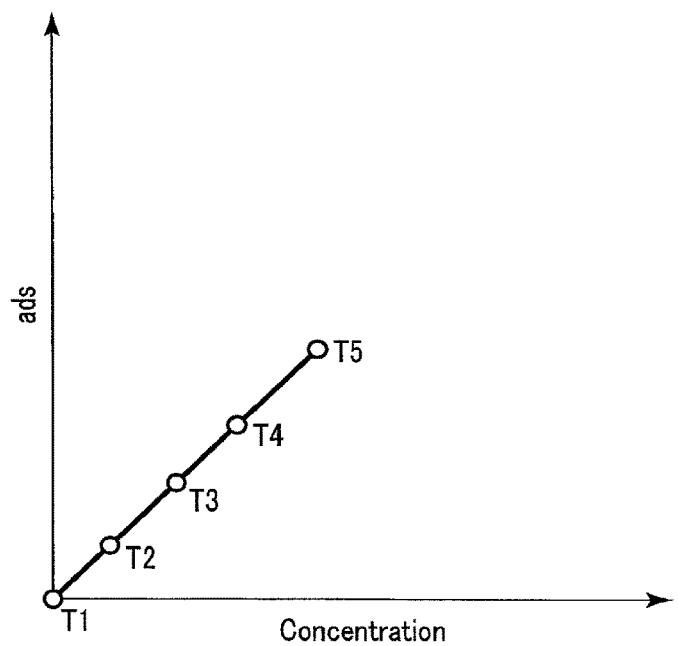
F I G. 20

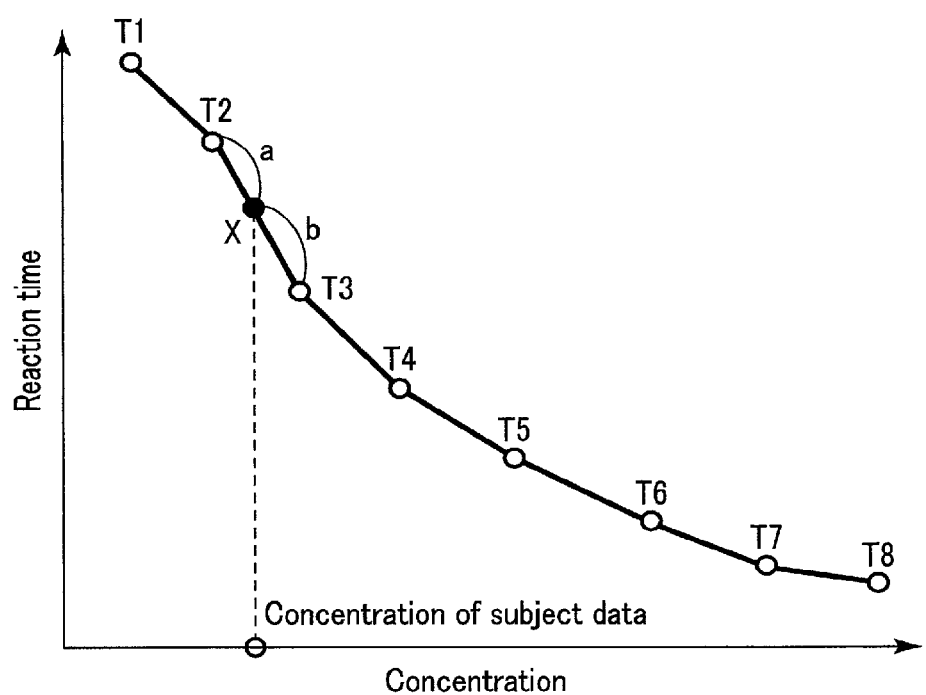
F I G. 25

CALIBRATION CURVE GENERATING METHOD AND AUTOMATIC ANALYZING APPARATUS

CROSS-REFERENCE TO RELATED APPLICATIONS

This application is based upon and claims the benefit of priority from prior Japanese Patent Application No. 2017-210278, filed Oct. 31, 2017 and No. 2018-201939, filed Oct. 26, 2018, the entire contents of both which are incorporated herein by reference.

FIELD

Embodiments described herein relate generally to a calibration curve generating method and an automatic analyzing apparatus.

BACKGROUND

An automatic analyzing apparatus is adapted to dispensed reagents for various test assay to patient samples, such as blood, to have each reagent reacts with a specific ingredient in the patient samples. The automatic analyzing apparatus subjects the reaction liquid obtained in this manner to, for example, optical measurement and analyzes the ingredients in the patient samples that correspond to the test assay.

For such an automatic analyzing apparatus, a technique utilizing latex agglutination for enhancing the measurement sensitivity is known. According to the method for latex agglutination, a reagent is formed of latex particles (i.e., insoluble carriers) and antibodies attached to the surfaces of the latex particles, and the reagent is dispensed to a sample to prepare a reaction liquid. Within the reaction liquid, antigens contained in the patient sample are bonded to the antibodies at the surfaces of the latex particles, causing the agglutination of the latex particles. Subsequently, in the course of the latex particle agglutination, the reaction liquid is irradiated with light, and the intensity of light transmitted through the reaction liquid or the intensity of light scattered within the reaction liquid is measured to quantify the detection target in the sample.

When the agglutination method adopts particles of a large diameter, that is, a small reactive area for a given time, the antigen-antibody reaction to occur is weak but an intense scattering takes place to allow for the detection of a subtle agglutination. Conversely, with particles of a small diameter, a reactive area for a given time is large and a strong reaction occurs, but the scattering is weak and difficult to detect. There is normally a limit to particle concentrations when the latex agglutination method aims at highly sensitive measurement by adopting large-sized particles. For example, reaching or exceeding a certain particle concentration would suppress the light transmission and degrade detectivity. Also, if measured objects are highly concentrated, the agglomerates could grow too large and causes autoagglutination, therefore deviating from the light path and decreasing the light absorbance. As such, use of large-sized particles poses a bar to securing a dynamic range.

In the case of using small-sized particles, a higher particle concentration is tolerated so that the measurement is enabled for the high concentration range for the measured objects. However, while the self-settling-out due to the agglutination is rendered less likely, and a wide dynamic range can be secured, the detection sensitivity is inferior. The reagents in today's latex agglutination adopt particles of two or more sizes, including a large diameter for high sensitivity and a small diameter for dynamic range, so as to realize both the high sensitivity and wide range properties. This, however, allows them to cancel out their advantages to some extent, and the original performance that would have been expected from flat-sized particles is diluted.

BRIEF DESCRIPTION OF THE DRAWINGS

FIG. 4 is a diagram showing measurement values and reaction curves for standard samples.

FIG. 5 is a diagram showing a photometry timing line and photometry timings, set based on the reaction curves in FIG. 4.

FIG. 11 is a diagram showing reaction curves, a photometry timing line, and a subject data approximation curve.

FIG. 12 is a diagram showing corrected calibration data related to FIG. 11.

FIG. 13 is a diagram for describing one exemplary method for obtaining a standard calibration curve according to a second embodiment.

FIG. 14 is a diagram showing a standard calibration curve obtained by the method described with reference to FIG. 13.

FIG. 15 is a diagram for describing another exemplary method for obtaining a standard calibration curve.

FIG. 16 is a diagram showing a standard calibration curve obtained by the method described with reference to FIG. 15.

FIG. 18 is a diagram showing a standard calibration curve obtained by the method described with reference to FIG. 17.

FIG. 19 is a diagram for describing yet another exemplary method for obtaining a standard calibration curve.

FIG. 20 is a diagram showing part of a standard calibration curve obtained by the method described with reference to FIG. 19.

FIG. 25 is a diagram showing corrected calibration data corresponding to FIG. 24.

DETAILED DESCRIPTION

In general, according to one embodiment, a method is for generating a calibration curve based on results of photometry on a plurality of standard samples each containing a detection target in a known concentration. The concentration differs between the standard samples. The method includes obtaining the results of photometry on the standard samples at different photometry timings, to generate the calibration curve.

Embodiments will be described with reference to the drawings.

First Embodiment (Automatic Analyzing Apparatus)

Figure 1:
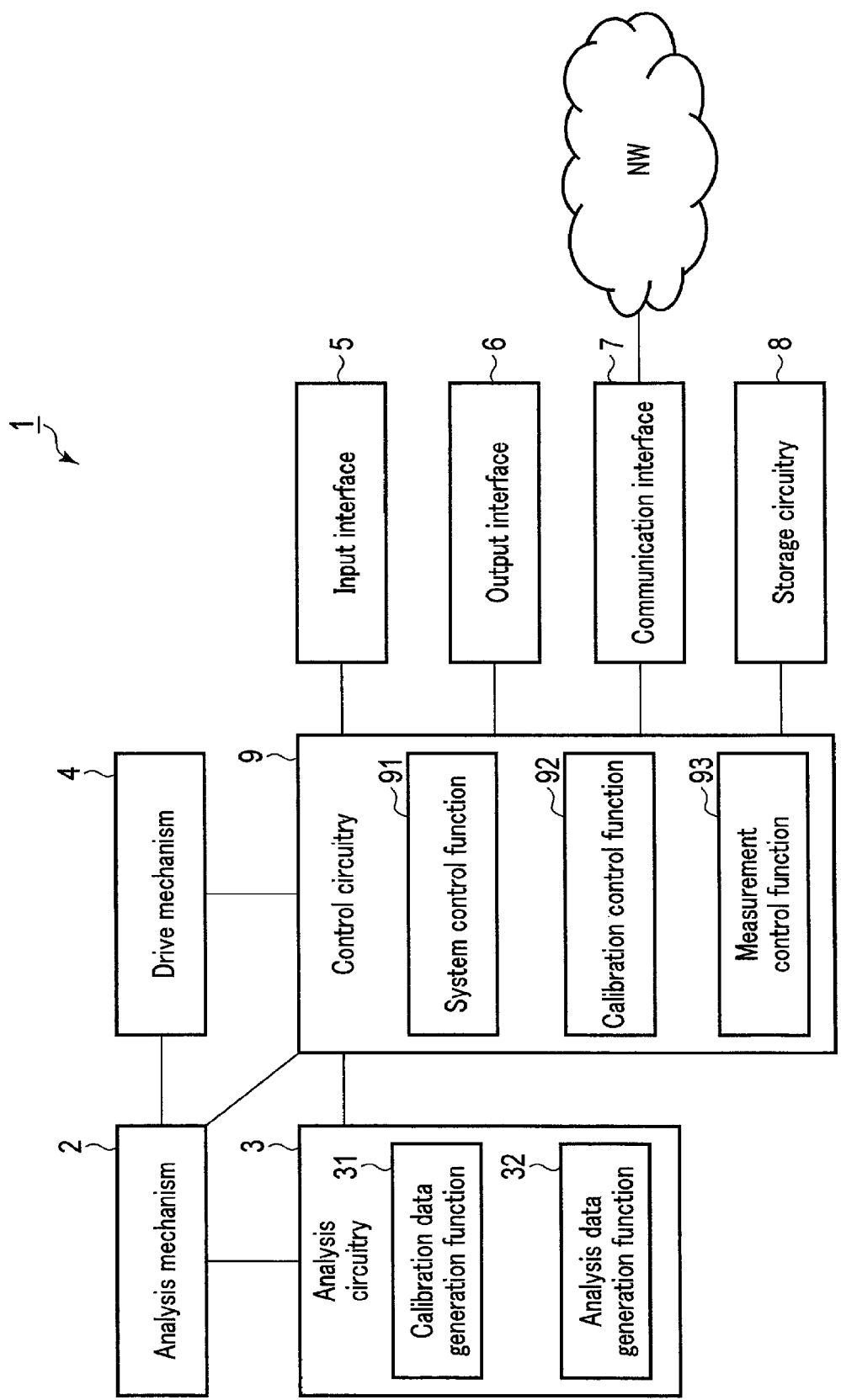
FIG. 1 is a block diagram showing one functional configuration for an automatic analyzing apparatus according to a first embodiment.

FIG. 1 is a block diagram showing one example of a functional configuration for an automatic analyzing apparatus 1 according to the first embodiment. In FIG. 1, the automatic analyzing apparatus 1 includes an analysis mechanism 2, analysis circuitry 3, a drive mechanism 4, an input interface 5, an output interface 6, a communication interface 7, storage circuitry 8, and control circuitry 9.

The automatic analyzing apparatus 1 is an apparatus adapted to measure concentrations of samples, etc., by the latex agglutination method, and it can use various carrier particles as insoluble carriers to be dispensed to the samples. Available examples of the carrier particles include latex particles, polystyrenes, polystyrene latexes, silica particles, and so on.

The analysis mechanism 2 dispenses to a sample, such as a standard sample or a subject sample, a reagent for each test assay set for the sample. The analysis mechanism 2 measures reaction liquids obtained by dispensing the reagent to the samples, and generates standard data and subject data which may be represented as, for example, a light absorbance level or a scattered light intensity. In the context of this embodiment, the standard data is indicative of measurement data of the light absorbance level or the scattered light intensity for the standard sample containing a detection target in a known concentration. Also, the subject data is indicative of measurement data of the light absorbance level or the scattered light intensity for the subject sample.

The analysis circuitry 3 is a processor to analyze the standard data and the subject data generated by the analysis mechanism 2, and to generate calibration data, analysis data, etc. The analysis circuitry 3 constitutes one example of processing circuitry. The calibration data is indicative of, for example, a relationship between the standard data and a standard calibration curve that is preset for the standard sample. The standard calibration curve is a calibration curve which, for example, has been calculated by a reagent manufacturer using the standard sample and which has high measurement accuracy. The analysis data is data which can be obtained by analyzing the subject data based on the calibration data and which may be represented as, for example, a concentration value, an enzyme activity value, etc.

The analysis circuitry 3 generates the calibration data, the analysis data, etc., by executing operation programs stored in the storage circuitry 8 and realizing functions corresponding to the operation programs. For example, generation of the calibration data by the analysis circuitry 3 is based on: standard data acquired with a standard sample with a known light absorbance level or a known scattered light intensity and a concentration value of 0, and with multiple standard samples each with a known light absorbance level or a known scattered light intensity and a known concentration value; a standard calibration curve preset with these standard samples; preset photometry timings; and so on. Also, generation of the analysis data by the analysis circuitry 3 is based on: subject data; calibration data with a test assay corresponding to this subject data; preset photometry timings; and so on. The analysis circuitry 3 outputs the generated calibration data, analysis data, etc., to the control circuitry 9.

The drive mechanism 4 drives the analysis mechanism 2 under the control of the control circuitry 9. The drive mechanism 4 is configured with, for example, a gear, a stepping motor, a belt conveyor, a lead screw, and so on.

The input interface 5 accepts, for example, settings of assay parameters, etc., for each test assay intended for a measurement-requested sample, from an operator or via an in-hospital network NW. The input interface 5 may be configured with a mouse, a keyboard, a touch pad which receives input instructions through contact on its operation screen, or the like. The input interface 5 is connected to the control circuitry 9 so that it converts operational instructions, input by an operator, into electric signals and outputs them to the control circuitry 9. In the present disclosure, the input interface 5 is not limited to physical operation components such as a mouse and a keyboard. Examples of the input interface 5 may also include processing circuitry for electric signals, which is adapted to receive an electric signal corresponding to the operational instruction input from an external input device separate from the automatic analyzing apparatus 1, and to output the electric signal to the control circuitry 9.

The output interface 6 is connected to the control circuitry 9 and outputs the signals coming from the control circuitry 9. The output interface 6 is realized by, for example, display circuitry, print circuitry, and the like. Such display circuitry may be a CRT display, a liquid crystal display, an organic EL display, an LED display, a plasma display, etc. Also, the display circuitry may include processing circuitry for converting data of a display object into video signals and supplying the video signals to external entities. The print circuitry may be a printer, etc. The print circuitry may also include output circuitry for supplying data of a print object to external entities.

The communication interface 7 is connected to, for example, the in-hospital network NW. The communication interface 7 performs data communication with a hospital information system (HIS) via the in-hospital network NW. It is also possible for the communication interface 7 to perform data communication with the HIS via a laboratory information system (LIS) connected to the in-hospital network NW.

The storage circuitry 8 may be, for example, a processor-readable storage medium such as a magnetic or optical storage medium or a semiconductor memory. It is not a requisite to realize the storage circuitry 8 by a single storage medium. For example, the storage circuitry 8 may be configured with multiple storage media.

The storage circuitry 8 stores the operation programs for the analysis circuitry 3 to be executed, as well as operation programs for the control circuitry 9 to be executed. The storage circuitry 8 stores calibration curve information for the reagents stored in the analysis mechanism 2. The calibration curve information contains, for each test assay, data for the standard calibration curve preset for a reagent. For example, the calibration curve information also contains, for each test assay, data for a photometry timing line preset for the reagent. The calibration curve information may be provided from a reagent manufacturer for each unit of, for example, a reagent lot via the communication interface 7. Note that the calibration curve information may also be provided from a reagent manufacturer together with reagents, and then input by an operator via the input interface 5.

The photometry timing line is a reference line that stipulates photometry timings. The photometry timings refer to the time points for acquiring information such as light absorbance levels for generating the calibration data. That is, for example, the photometry timings each represent the time elapsed since a reagent formed of carrier particles—the insoluble carriers to which ingredients to be bonded to a detection target were attached—has been dispensed to a standard sample. The photometry timings also refer to the time points for acquiring information such as light absorbance levels for generating the analysis data. That is, for example, the photometry timings each represent the time elapsed since a reagent formed of carrier particles has been dispensed to a subject sample.

Figure 2:
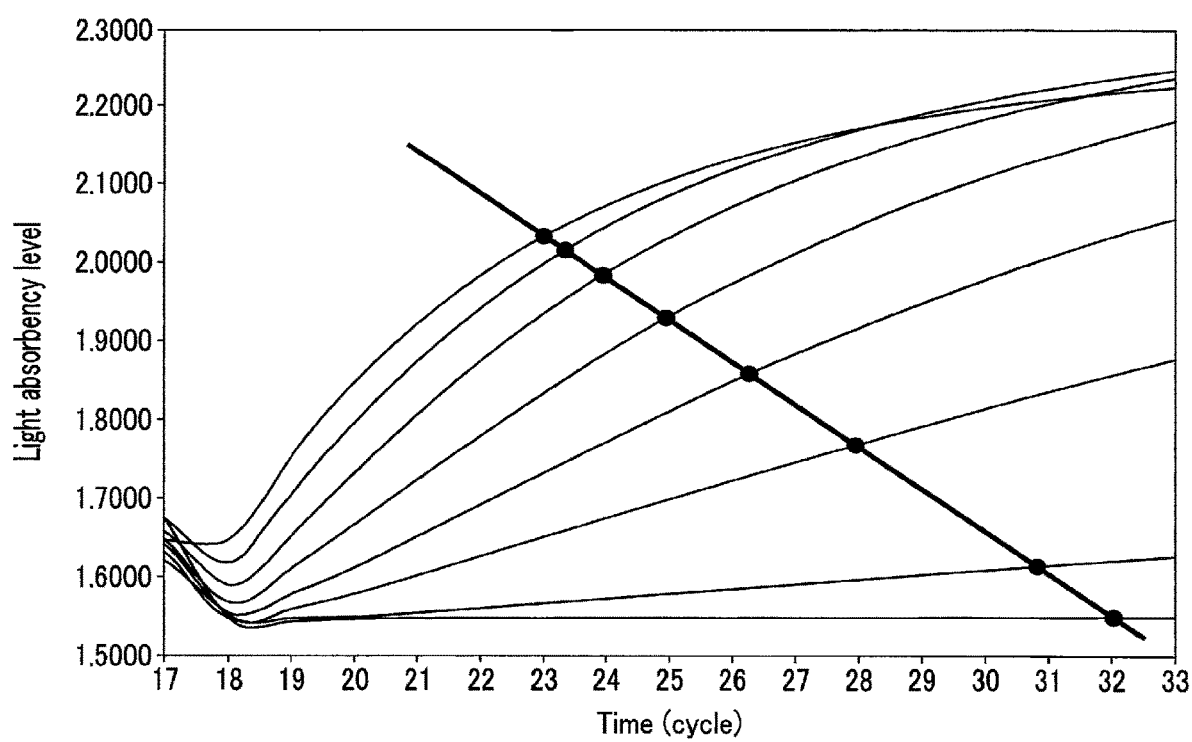
FIG. 2 is a diagram showing a photometry timing line and photometry timings according to the first embodiment.

FIG. 2 shows, by way of example, a photometry timing line and photometry timings for a given reagent. The bold solid line in FIG. 2 is the photometry timing line. Also, the thin solid lines are reaction curves each obtained based on the light absorbance levels measured after the dispense of a reagent to a standard sample of a given concentration. Among the reaction curves shown in FIG. 2, the reaction curve exhibiting a steeper rise in the light absorbance level corresponds to the standard sample of a higher concentration. The dot marks are provided at the intersections of the photometry timing line and the reaction curves, and each indicate the photometry timing. In FIG. 2, the photometry timing line obliquely extends from the lower right to the upper left. In other words, the photometry timing line is set such that the photometry timing is put off when a reagent is dispensed to a standard sample of a low concentration, and the photometry timing is put ahead when the reagent is dispensed to a standard sample of a high concentration. Note that the calibration curve information may contain data for the photometry timings, instead of the data for the photometry timing line.

The storage circuitry 8 stores the calibration data generated by the analysis circuitry 3, for each test assay. The storage circuitry 8 stores the analysis data generated by the analysis circuitry 3, for each subject sample.

The control circuitry 9 is a processor functioning as a center of the automatic analyzing apparatus 1. The control circuitry 9 executes the operation programs stored in the storage circuitry 8 to realize functions corresponding to the operation programs. The control circuitry 9 may be provided with a storage area for storing at least part of the data stored in the storage circuitry 8.

Figure 3:
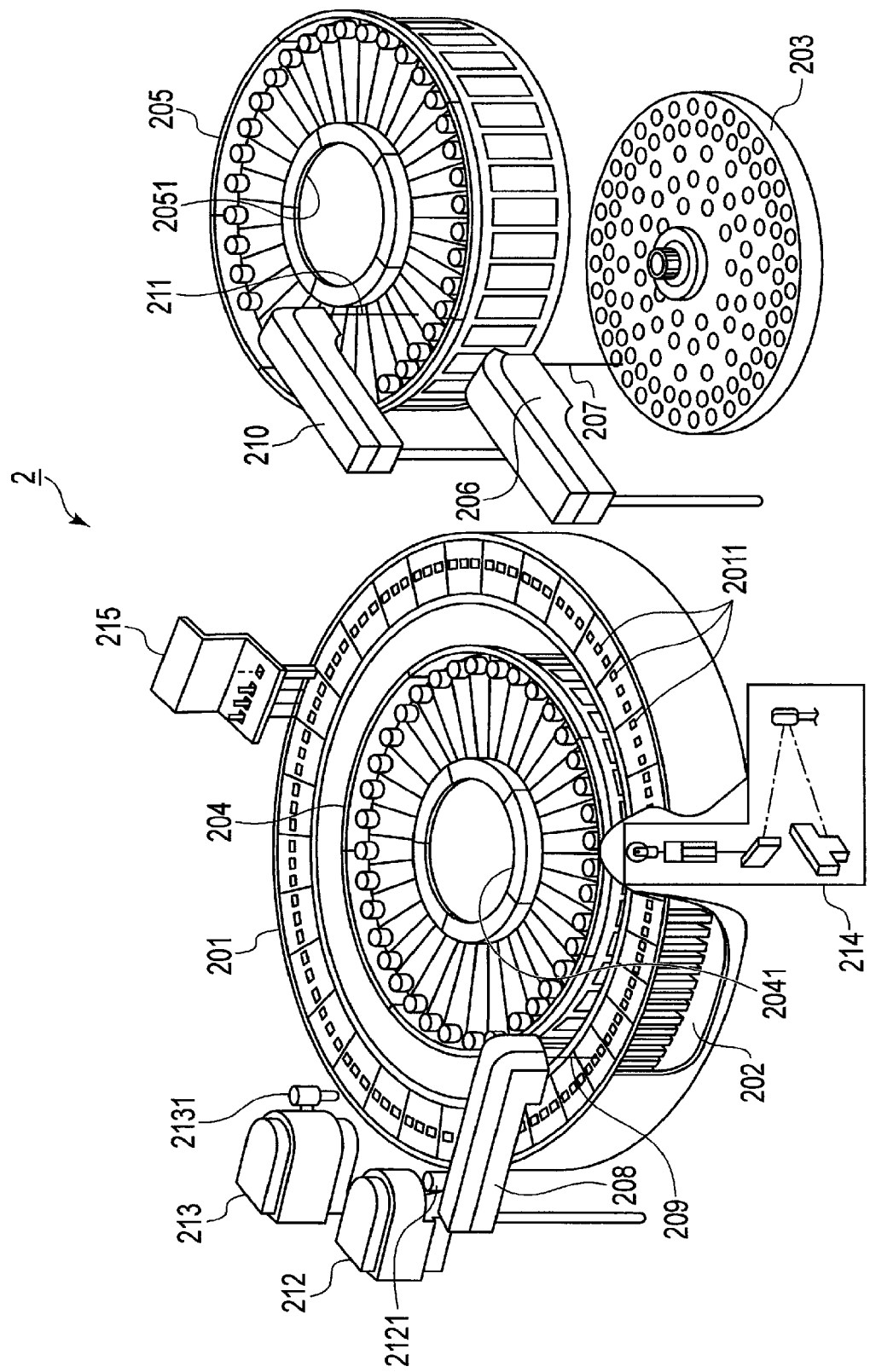
FIG. 3 is a diagram showing one design for the analysis mechanism in FIG. 1.

FIG. 3 schematically shows one exemplary design for the analysis mechanism 2 in FIG. 1. In FIG. 3, the analysis mechanism 2 includes a reaction disk 201, an incubation unit 202, a sample disk 203, a first-reagent carousel 204, and the second-reagent carousel 205.

The reaction disk 201 conveys reaction containers 2011 along a predetermined path. More specifically, the reaction disk 201 holds the multiple reaction containers 2011 in an annular arrangement. The reaction disk 201 is rotated and stopped alternately at regular time intervals by the drive mechanism 4.

The reaction containers 2011 are formed of, for example, glass. The reaction containers 2011 each have a square pillar shape with an opening at the top. The square pillar shape is formed by first to fourth side walls, and light emitted from a light source of a photometry unit 214 enters from an outer face of the first side wall. The light incident from the outer face of the first side wall exits from an outer face of the second side wall that is opposite the first side wall among the first to fourth side walls.

The incubation unit 202 stores a thermal medium that is set at a predetermined temperature. By immersing the reaction containers 2011 in the stored thermal medium, the incubation unit 202 increases the temperature of the reaction liquid contained in the reaction containers 2011.

The sample disk 203 holds multiple sample containers containing samples. The sample disk 203 is rotated by the drive mechanism 4.

The first-reagent carousel 204 is adapted for cold storage of multiple reagent containers that contain a first reagent for reaction with a given ingredient in standard samples and subject samples. The first reagent may be, for example, a buffer solution containing bovine serum albumin (BSA), etc. A reagent label is affixed to the reagent containers. An optical mark indicative of reagent information may be printed on the reagent label. For such an optical mark, for example, any pixel code such as a one-dimensional pixel code and a two-dimensional pixel code may be used. The reagent information is information related to the reagent contained in the corresponding reagent container and includes, for example, a reagent name, a reagent manufacturer code, a reagent assay code, a bottle type, a bottle size, a volume, a production lot number, a validity period, etc.

The first-reagent carousel 204 is also adapted for cold storage of multiple standard-sample containers containing standard samples. The standard-sample containers may contain standard samples of the same ingredient in different concentrations. Note that the standard-sample containers may be held in the sample disk 203.

The first-reagent carousel 204 encloses reagent racks 2041 in such a manner that they can be rotated. The reagent racks 2041 hold the multiple reagent containers and the multiple standard-sample containers in an annular arrangement. The reagent racks 2041 are rotated by the drive mechanism 4. Also, the first-reagent carousel 204 includes a reader (not illustrated) for reading the reagent information from the reagent labels affixed to the reagent containers. The read reagent information is stored in the storage circuitry 8.

A predetermined first-reagent aspiration position is provided above the first-reagent carousel 204. The first-reagent aspiration position is set at, for example, the intersection between the rotational trajectory of a first-reagent dispensing probe 209, and the traveling path of the openings of the reagent containers and the standard-sample containers annularly arranged by the reagent racks 2041.

The second-reagent carousel 205 is adapted for cold storage of multiple reagent containers that contain a second reagent for constituting a dual-reagent system with the first reagent. The second reagent may be a solution containing insoluble carriers, e.g., carrier particles, to which antigens or antibodies to be bonded to, or separated from, given antibodies or antigens in a sample through specific antigen-antibody reactions were attached. The substances to be bonded or separated by the specific reactions may be enzymes, substrates, aptamers, and receptors. The second-reagent depository 205 encloses reagent racks 2051 in such a manner that they are able to turn.

The reagent racks 2051 hold the multiple reagent containers in an annular arrangement. The second-reagent depository 205 may also be adopted for cold storage of the standard-sample containers containing standard samples. The reagent racks 2051 are rotated by the drive mechanism 4. Also, the second-reagent carousel 205 includes a reader (not illustrated) for reading the reagent information from the reagent labels affixed to the reagent containers. The read reagent information is stored in the storage circuitry 8.

A predetermined second-reagent aspiration position is provided above the second-reagent carousel 205. The second-reagent aspiration position is set at, for example, the intersection between the rotational trajectory of a second-reagent dispensing probe 211 and the traveling path of the openings of the reagent containers annularly arranged by the reagent racks 2051.

The analysis mechanism 2 shown in FIG. 3 further includes a sample dispensing arm 206, a sample dispensing probe 207, a first-reagent dispensing arm 208, the first-reagent dispensing probe 209, a second-reagent dispensing arm 210, the second-reagent dispensing probe 211, a first stirring unit 212, a second stirring unit 213, the photometry unit 214, and a cuvette washing unit 215.

The sample dispensing arm 206 is provided between the reaction disk 201 and the sample disk 203. The sample dispensing arm 206 is adapted so that it can vertically ascend and descend, and also horizontally rotate, by the drive mechanism 4. The sample dispensing arm 206 holds the sample dispensing probe 207 at its one end.

The sample dispensing probe 207 rotates along the arc rotational trajectory in conjunction with the rotation of the sample dispensing arm 206. This rotational trajectory is set so that the openings of the sample containers held by the sample disk 203 will be positioned on it. Also, the rotational trajectory of the sample dispensing probe 207 includes a sample discharge position for the sample dispensing probe 207 to dispense sample to the reaction containers 2011. The sample dispensing position corresponds to the intersection between the rotational trajectory of the sample dispensing probe 207 and the traveling path of the reaction containers 2011 held by the reaction disk 201.

The sample dispensing probe 207 is driven by the drive mechanism 4 so that it ascends and descends at a position directly above the opening of the sample container held by the sample disk 203 or at the sample dispensing position. The sample dispensing probe 207 also aspirates the sample from the sample container directly below it, under the control of the control circuitry 9. At the sample dispensing position, the sample dispensing probe 207 dispenses the aspirated sample to the reaction container 2011 directly below it, under the control of the control circuitry 9.

The first-reagent dispensing arm 208 is provided near the outer periphery of the first-reagent carousel 204. The first-reagent dispensing arm 208 is adapted so that it can vertically ascend and descend, and also horizontally rotate, by the drive mechanism 4. The first-reagent dispensing arm 208 holds the first-reagent dispensing probe 209 at its one end.

The first-reagent dispensing probe 209 rotates along the arc rotational trajectory in conjunction with the rotation of the first-reagent dispensing arm 208. This rotational trajectory includes the first-reagent aspiration position. Also, the rotational trajectory of the first-reagent dispensing probe 209 includes a first-reagent dispensing position that is set for the first-reagent dispensing probe 209 to dispense the aspirated first reagent or the aspirated standard sample to the reaction containers 2011. The first-reagent dispensing position corresponds to the intersection between the rotational trajectory of the first-reagent dispensing probe 209 and the traveling path of the reaction containers 2011 held by the reaction disk 201.

The first-reagent dispensing probe 209 is driven by the drive mechanism 4 so that it ascends and descends at the first-reagent aspiration position or the first-reagent dispensing position on the rotational trajectory. The first-reagent dispensing probe 209 aspirates the first reagent or the standard sample from the reagent container directly below it at the first-reagent aspiration position, under the control of the control circuitry 9. Also, the first-reagent dispensing probe 209 dispenses the aspirated first reagent or the aspirated standard sample to the reaction container 2011 directly below it at the first-reagent discharge position, under the control of the control circuitry 9. The first-reagent dispensing probe 209 is one example of a dispensing unit according to this embodiment.

The second-reagent dispensing arm 210 is provided near the outer periphery of the first-reagent carousel 204. The second-reagent dispensing arm 210 is adapted so that it can vertically ascend and descend, and also horizontally rotate, by the drive mechanism 4. The second-reagent dispensing arm 210 holds the second-reagent dispensing probe 211 at its one end.

The second-reagent dispensing probe 211 rotates along the arc rotational trajectory in conjunction with the rotation of the second-reagent dispensing arm 210. This rotational trajectory includes the second-reagent aspiration position. Also, the rotational trajectory of the second-reagent dispensing probe 211 includes a second-reagent discharge position that is set for the second-reagent dispensing probe 211 to discharge the aspirated second reagent to the reaction containers 2011. The second-reagent discharge position corresponds to the intersection between the rotational trajectory of the second-reagent dispensing probe 211 and the traveling path of the reaction containers 2011 held by the reaction disk 201.

The second-reagent dispensing probe 211 is driven by the drive mechanism 4 so that it ascends and descends at the second-reagent aspiration position or the second-reagent discharge position on the rotational trajectory. The second-reagent dispensing probe 211 aspirates the second reagent from the reagent container directly below it at the second-reagent aspiration position, under the control of the control circuitry 9. Also, the second-reagent dispensing probe 211 dispenses the aspirated second reagent to the reaction container 2011 directly below it at the second-reagent discharge position, under the control of the control circuitry 9. The second-reagent dispensing probe 211 is therefore another example of the discharge unit according to the embodiment.

The first stirring unit 212 is provided near the outer periphery of the reaction disk 201. The first stirring unit 212 holds a first stirring arm 2121, and a first stirring tool at the distal end of the first stirring arm 2121. Using the first stirring tool, the first stirring unit 212 stirs the standard sample and the first reagent contained in the reaction container 2011 at a first stirring position on the reaction disk 201. Also, the first stirring unit 212 uses the first stirring tool to stir the other sample and the first reagent contained in the reaction container 2011 at the first stirring position on the reaction disk 201.

The second stirring unit 213 is provided near the outer periphery of the reaction disk 201. The second stirring unit 213 holds a second stirring arm 2131, and a second stirring tool at the distal end of the second stirring arm 2131. Using the second stirring tool, the second stirring unit 213 stirs the standard sample, the first reagent, and the second reagent contained in the reaction container 2011 at a second stirring position on the reaction disk 201. Also, the second stirring unit 213 holds the second stirring tool to stir other sample, the first reagent, and the second reagent contained in the reaction container 2011 at the second stirring position.

The photometry unit 214 optically measures the reaction liquid thus prepared from the sample, the first reagent, and the second reagent dispensed into the reaction containers 2011. The photometry unit 214 includes a light source and a photodetector. Under the control of the control circuitry 9, the photometry unit 214 emits light from the light source. The emitted light enters the reaction container 2011 through the first sidewall, and exits the reaction container 2011 through the second sidewall which is the opposite side of the first sidewall. The photometry unit 214 detects the light coming out of the reaction container 2011 by the photodetector.

More specifically, and for example, the photodetector is disposed at a position on the optical axis of the light emitted from the light source to the reaction container 2011. The photodetector detects the light having passed through the reaction liquid of the standard sample, the first reagent, and the second reagent in the reaction container 2011, and generates raw analog data for generating the standard data represented as a light absorbance level based on the intensity of the detected light. The photodetector also detects the light having passed through the reaction liquid of the subject sample, the first reagent, and the second reagent in the reaction container 2011, and generates raw analog data for generating the subject data represented as a light absorbance level based on the intensity of the detected light. The photometry unit 214 outputs the raw analog data for generating the standard data and the subject data to the analysis circuitry 3.

The washing unit 215 washes the inside of the reaction containers 2011 for which the measurement of the reaction liquid by the photometry unit 214 has been completed.

Turning to FIG. 1, the control circuitry 9 executes the operation programs stored in the storage circuitry 8 to realize functions corresponding to these programs. For example, the control circuitry 9 runs the operation programs to provide a system control function 91, a calibration control function 92, and a measurement control function 93. Note that the present embodiment will be described assuming that a single processor realizes the system control function 91, the calibration control function 92, and the measurement control function 93. However, the embodiment is not limited to such a configuration. For example, multiple independent processors may be used in combination to form control circuitry to have the respective processors run the operation programs, so that the system control function 91, the calibration control function 92, and the measurement control function 93 will be performed.

The system control function 91 is a function to take total control over the components of the automatic analyzing apparatus 1, based on the input information via the input interface 5.

The calibration control function 92 is a function to control the analysis mechanism 2 and the drive mechanism 4 in order to generate the standard data. More specifically, the control circuitry 9 performs the calibration control function 92 at predetermined timings. The predetermined timings may be, for example, a timing of initial setting, a timing of apparatus activation, a timing of receipt of an input instruction from an operator to start a calibration operation, and so on.

With the calibration control function 92, the control circuitry 9 controls the analysis mechanism 2 and the drive mechanism 4. Controlling the analysis mechanism 2 and the drive mechanism 4 causes the analysis mechanism 2 to generate the standard data. More specifically, and for example, the first-reagent dispensing probe 209 of the analysis mechanism 2 is driven by the drive mechanism 4 so that it aspirates the standard sample from the first-reagent carousel 204 and dispense the aspirated standard sample to the reaction container 2011. The first-reagent dispensing probe 209 aspirates the first reagent from the first-reagent carousel 204 and dispenses the aspirated first reagent to the reaction container 2011 to which the standard sample has been dispensed. The first stirring unit 212 stirs the solution of the standard sample and the added first reagent.

The second-reagent dispensing probe 211 aspirates the second reagent from the second-reagent carousel 205 and dispenses the aspirated second reagent to the mixture liquid of the standard sample and the first reagent. The second stirring unit 213 stirs the solution formed of the mixture liquid and the dispensed second reagent. The photometry unit 214 optically measures the reaction liquid obtained by stirring the standard sample, the first reagent, and the second reagent. The photometry unit 214 outputs the raw analog data for generating the standard data to the analysis circuitry 3. The photometry unit 214 repeats the measurement of the reaction liquid a predetermined number of times at a preset cycle, so that the set of generated standard data is supplied to the analysis circuitry 3. The analysis mechanism 2 repeats these operations for a plurality of standard samples of given concentrations, so that the analysis circuitry 3 is supplied with each generated standard data.

The measurement control function 93 is a function to control the analysis mechanism 2 and the drive mechanism 4 in order to generate the subject data. More specifically, the control circuitry 9 performs the measurement control function 93 according to predetermined instructions. Examples of the predetermined instructions include an instruction input from an operator to start a measurement operation, an instruction indicating that a preset time point has been reached, and so on.

With the measurement control function 93, the control circuitry 9 controls the analysis mechanism 2 and the drive mechanism 4. Controlling the analysis mechanism 2 and the drive mechanism 4 causes the analysis mechanism 2 to generate the subject data. More specifically, the sample dispensing probe 207 of the analysis mechanism 2 is driven by the drive mechanism 4 so that it aspirates the subject sample from the sample disk 203 and dispenses the aspirated subject sample to the reaction container 2011. The first-reagent dispensing probe 209 aspirates the first reagent from the first-reagent carousel 204 and dispenses the aspirated first reagent to the reaction container 2011 to which the subject sample has been dispensed. The first stirring unit 212 stirs the solution of the subject sample and the dispensed first reagent.

The second-reagent dispensing probe 211 aspirates the second reagent from the second-reagent carousel 205 and dispense the aspirated second reagent to the mixture liquid of the subject sample and the first reagent. The second stirring unit 213 stirs the solution formed of the mixture liquid and the dispensed second reagent. The photometry unit 214 optically measures the reaction liquid obtained by stirring the subject sample, the first reagent, and the second reagent. The photometry unit 214 outputs the raw analog data for generating the subject data to the analysis circuitry 3. The photometry unit 214 repeats the measurement of the reaction liquid a predetermined number of times at a preset cycle, so that the set of generated standard data is supplied to the analysis circuitry 3.

The analysis circuitry 3 shown in FIG. 1 executes the operation programs stored in the storage circuitry 8 to perform functions corresponding to these programs. For example, the analysis circuitry 3 runs the operation programs to provide a calibration data generation function 31 and an analysis data generation function 32. Note that the present embodiment will assume that a single processor realizes the calibration data generation function 31 and the analysis data generation function 32, but no limitation is intended. For example, multiple independent processors may be used in combination to form analysis circuitry which has the respective processors run the operation programs, so that the calibration data generation function 31 and the analysis data generation function 32 will be performed.

The calibration data generation function 31 is a function to generate the calibration data based on the standard data generated by the analysis mechanism 2. More specifically, the analysis circuitry 3 performs the calibration data generation function 31 upon receipt of the standard data generated by the analysis mechanism 2. With the calibration data generation function 31, the analysis circuitry 3 reads data for the standard calibration curve and data for the photometry timing line, preset for the reagent for a given test assay, from the storage circuitry 8. The analysis circuitry 3 generates the calibration data based on the standard data, the standard calibration curve, and the photometry timing line. The analysis circuitry 3 causes the storage circuitry 8 to store the generated calibration data.

The analysis data generation function 32 is a function to generate the analysis data by analyzing the subject data generated by the analysis mechanism 2. More specifically, the analysis circuitry 3 performs the analysis data generation function 32 upon receipt of the subject data generated by the analysis mechanism 2. With the analysis data generation function 32, the analysis circuitry 3 reads the calibration data and the data for the photometry timing line, stored for the given test assay, from the storage circuitry 8. The analysis circuitry 3 generates the analysis data based on the subject data, the photometry timing line, and the calibration data.

(To Set the Standard Calibration Curve, Photometry Timing Line, and Photometry Timings)

Next, an example of setting the standard calibration curve, the photometry timing line, and the photometry timings will be described in detail. The description will assume an instance where, for example, a reagent manufacturer uses the above automatic analyzing apparatus 1 to measure light absorbance levels and set the standard calibration curve, the photometry timing line, and the photometry timings based on the measured light absorbance levels.

First off, the setting of the photometry timings and the photometry timing line will be described.

When designing or prescribing a reagent, time courses for standard samples are obtained. For example, standard samples S1 to S8 of known concentrations are dispensed to reaction containers 2011-1 to 2011-8, respectively. The example assumes that the standard sample S1 has a concentration value of 0, the standard sample S2 has a concentration value of 8 ng/ml, the standard sample S3 has a concentration value of 32 ng/ml, the standard sample S4 has a concentration value of 64 ng/ml, the standard sample S5 has a concentration value of 129 ng/ml, the standard sample S6 has a concentration value of 259 ng/ml, the standard sample S7 has a concentration value of 518 ng/ml, and the standard sample S8 has a concentration value of 1037 ng/ml.

Subsequently, the first reagent, which is a buffer solution, is dispensed to each of the standard samples S1 to S8 having been dispensed to the respective reaction containers 2011-1 to 2011-8. Each of the standard samples S1 to S8, dispensed with the first reagent, is stirred. After the stirring, the mixture liquids in the reaction containers 2011-1 to 2011-8 are subjected to incubation for a predetermined period at a predetermined temperature. After the incubation, the second reagent, which contains carrier particles stably carrying ingredients to be bonded to a detection target within the standard samples, is dispensed to each of the mixture liquids contained in the respective reaction containers 2011-1 to 2011-8. The mixture liquids dispensed with the second reagent are each stirred.

The reaction liquids contained in the respective reaction containers 2011-1 to 2011-8, i.e., the liquids made of the respective standard samples S1 to S8 with the first reagent and the second reagent, are irradiated with light while being subjected to incubation for a predetermined period at a predetermined temperature. More specifically, after the dispense of the second reagent to the standard samples S1 to S8, light is emitted from the light source to each of the reaction containers 2011-1 to 2011-8, for example, 33 times at the cycle of 4.5 seconds. The light transmitted through each of the reaction containers 2011-1 to 2011-8 is detected by the photodetector. The time courses for the standard samples are obtained based on the intensities of the detected lights.

FIG. 4 is a diagram showing, by way of example, measurement values and time courses (reaction curves) for the standard samples S1 to S8. FIG. 4 sets forth the light absorbance levels measured with the reaction liquids for the standard samples S1 to S8 of different concentrations, from the 17th cycle to the 33rd cycle. In FIG. 4, the square marks indicate the measurement values of the light absorbance levels, and the lines connecting the square marks are the reaction curves. The reaction curve C1 is calculated based on the light absorbance levels of the standard sample S1 at the respective cycles. As well as the reaction curve C1, each of the reaction curves C2 to C8 is calculated based on the light absorbance levels of the corresponding one of the standard samples S2 to S8 at the respective cycles. For the standard samples S2 to S4 of low concentrations, the reaction time and the light absorbance level increase substantially in proportion to each other. On the other hand, for the standard samples S5 to S8 of approximately middle to high concentrations, the light absorbance level reaches or approaches saturation as the reaction time passes.

The agglutination reactions with the carrier particles contained in the second reagent have a characteristic of causing a hook effect due to the saturation of light absorbance when a sample is of a high concentration. As such, the reaction liquids for the standard samples of high concentrations should desirably be subjected to the measurement at a photometry timing prior to the occurrence of a hook effect. According to the present embodiment, the photometry timing line is set based on the reaction curves C1 to C8 so that, for example, the photometry timing falls upon a shorter period of time for the standard sample of a higher concentration than the standard sample of a lower concentration. If there are crossing reaction curves, the photometry timings are set at the points preceding the time point at which the reaction curves cross each other.

For a more specific example, firstly, a single measurement value is extracted from each of the reaction curves C1 to C8 to form a data set, and using this data set, a regression analysis is performed with a light absorbance level as the objective variable. The regression analysis is repeated while changing the measurement values to extract, and regression equations satisfying predetermined conditions are selected from the calculated multiple regression equations. The predetermined conditions here include, for example, the determination coefficient of the regression equation being 0.9 or greater, and the order of the regression equation being a predetermined order or smaller. Subsequently, for each of the selected regression equations, points of intersection with the respective reaction curves C1 to C8 are obtained and a sum, or a product, etc., of the differences in light absorbance level between the neighboring intersection points are calculated. Then, from among the selected regression equations, the one with the greatest sum value, or the greatest product value, etc., is adopted as the photometry timing line.

Figure 6:
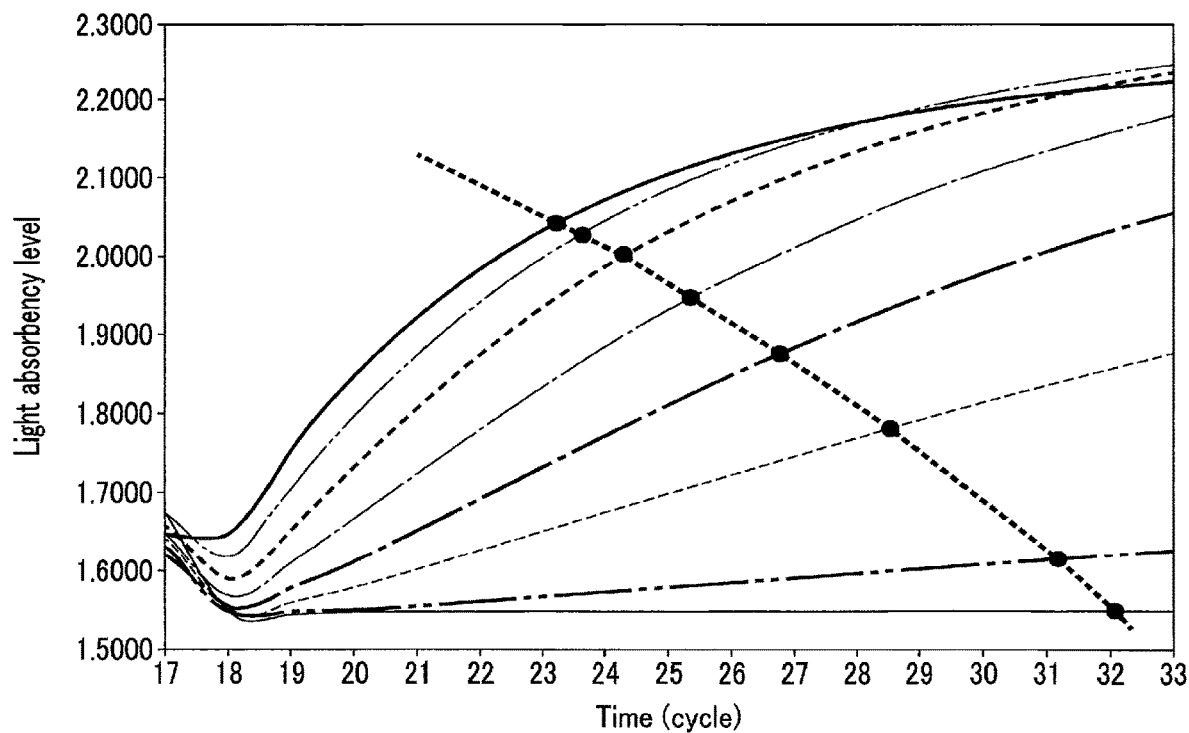
FIG. 6 is a diagram showing a photometry timing line and photometry timings, set based on the reaction curves in FIG. 4.

FIGS. 5 and 6 are diagrams each showing, by way of example, the photometry timing line and the photometry timings, set based on the reaction curves C1 to C8 shown in FIG. 4. In FIG. 5, the photometry timing line is shown as a bold broken line, which is linear. In FIG. 6, the photometry timing line is shown as a bold broken line, which is curved. FIGS. 5 and 6 show the photometry timings as dot marks. The photometry timings are set at the intersections between the photometry timing line and the reaction curves C1 to C8.

Note that the photometry timing line is not limited to the lines based on regression equations as shown in FIGS. 5 and 6. The photometry timing line may also be set based on measurement values used in the regression analyses. More specifically, and for example, regression equations satisfying the predetermined conditions are selected from the multiple regression equations calculated in the regression analyses. For each of the selected regression equations, the measurement values from the respective reaction curves C1 to C8, used in the regression analysis, are obtained and a sum, or a product, etc., of the differences between the neighboring measurement values (light absorbance levels) are calculated. Then, the line connecting points representing the measurement values, which yields the greatest sum value, or the greatest product value, etc., is adopted as the photometry timing line.

Figure 7:
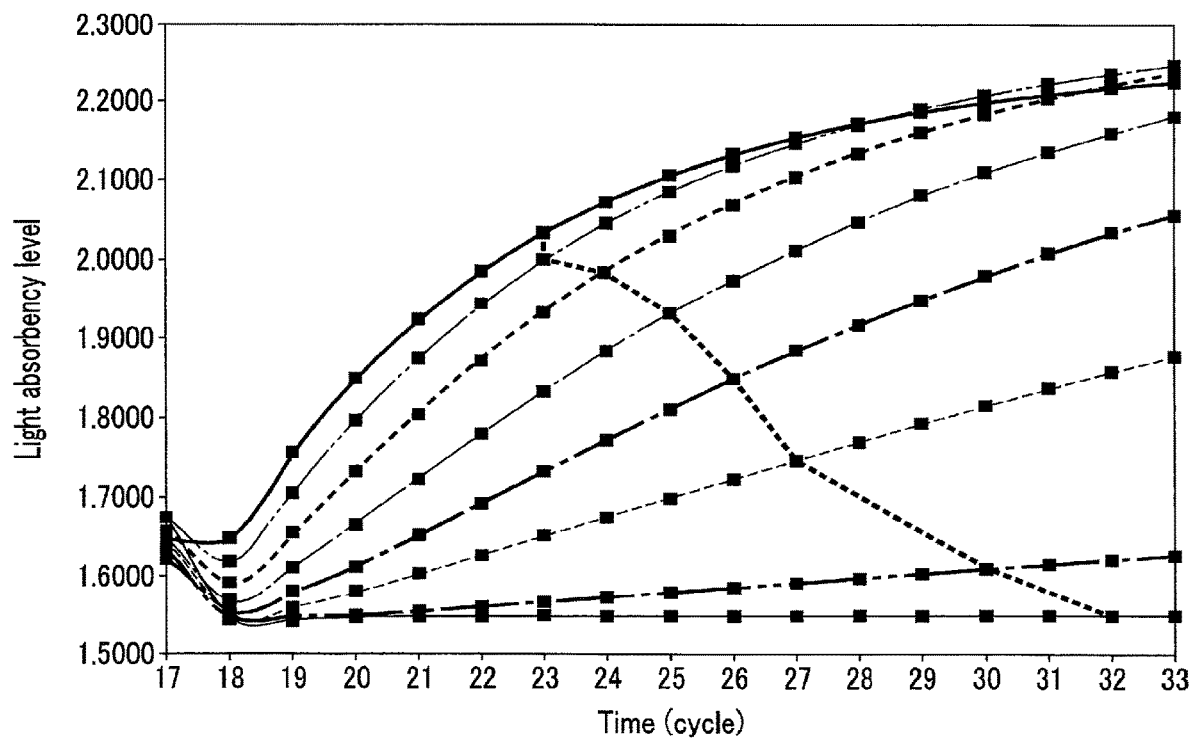
FIG. 7 is a diagram showing a photometry timing line and photometry timings, set based on measurement values.

FIG. 7 is a diagram showing, by way of example, the photometry timing line and the photometry timings, set based on the measurement values used in regression analyses. In the manner as previously discussed, values obtained from actual measurement can be used to set the photometry timing line.

Next, generation of a standard calibration curve will be described. The standard calibration curve is generated based on, for example, the light absorbance levels measured at the photometry timings set for the reaction curves C1 to C8, respectively. A standard calibration curve is indicative of the correlation between concentrations and light absorbance levels.

Figure 8:
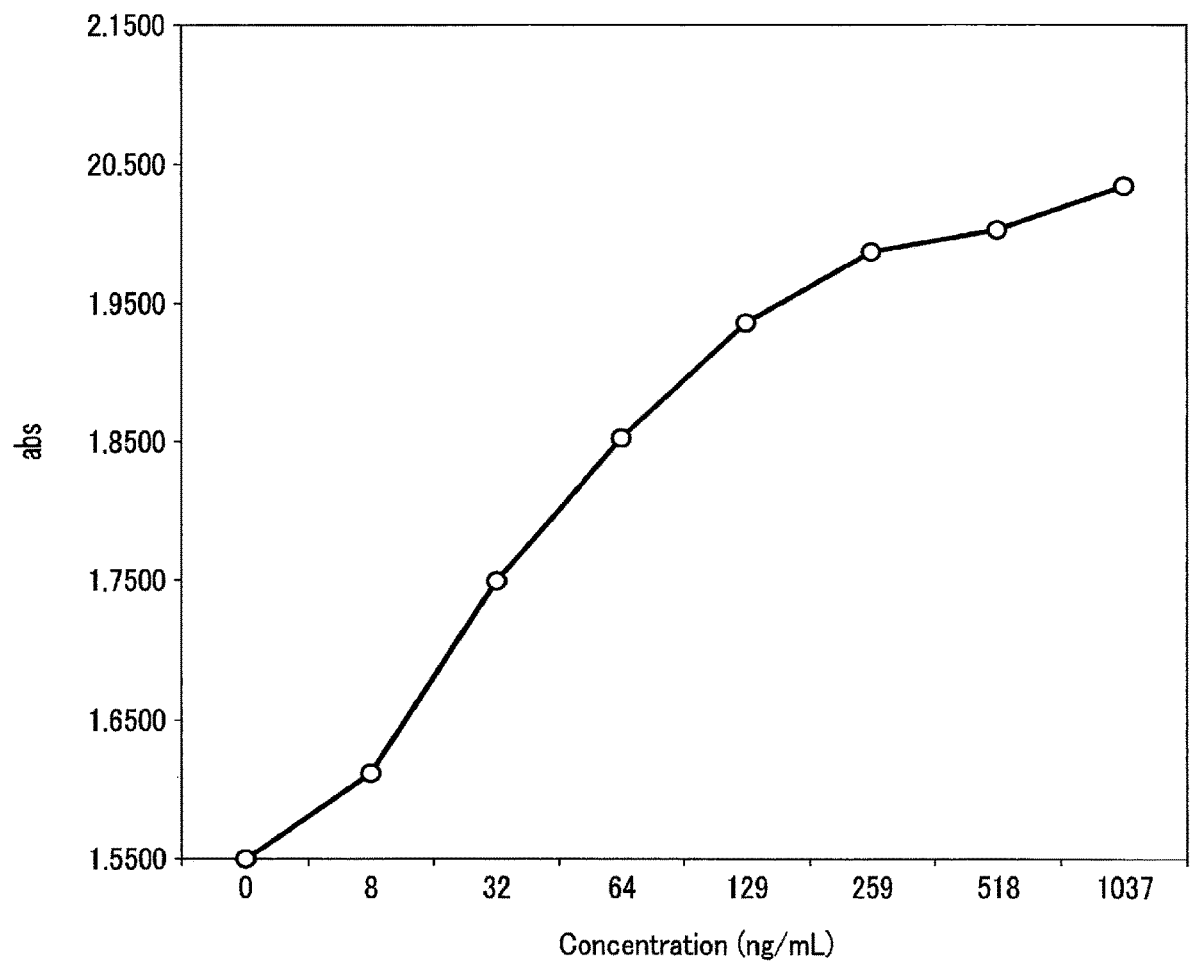
FIG. 8 is a diagram showing a standard calibration curve generated based on the photometry timings in FIG. 7.

FIG. 8 is a diagram showing an example of the standard calibration curve which is generated based on the photometry timings shown in FIG. 7. It can be seen from the standard calibration curve shown in FIG. 8 that when the concentration of a detection target is high, the light absorbance level is also high. Therefore, in the case of either a high or low concentration, the concentration of a detection target can be uniquely specified from the light absorbance level.

Figure 9:
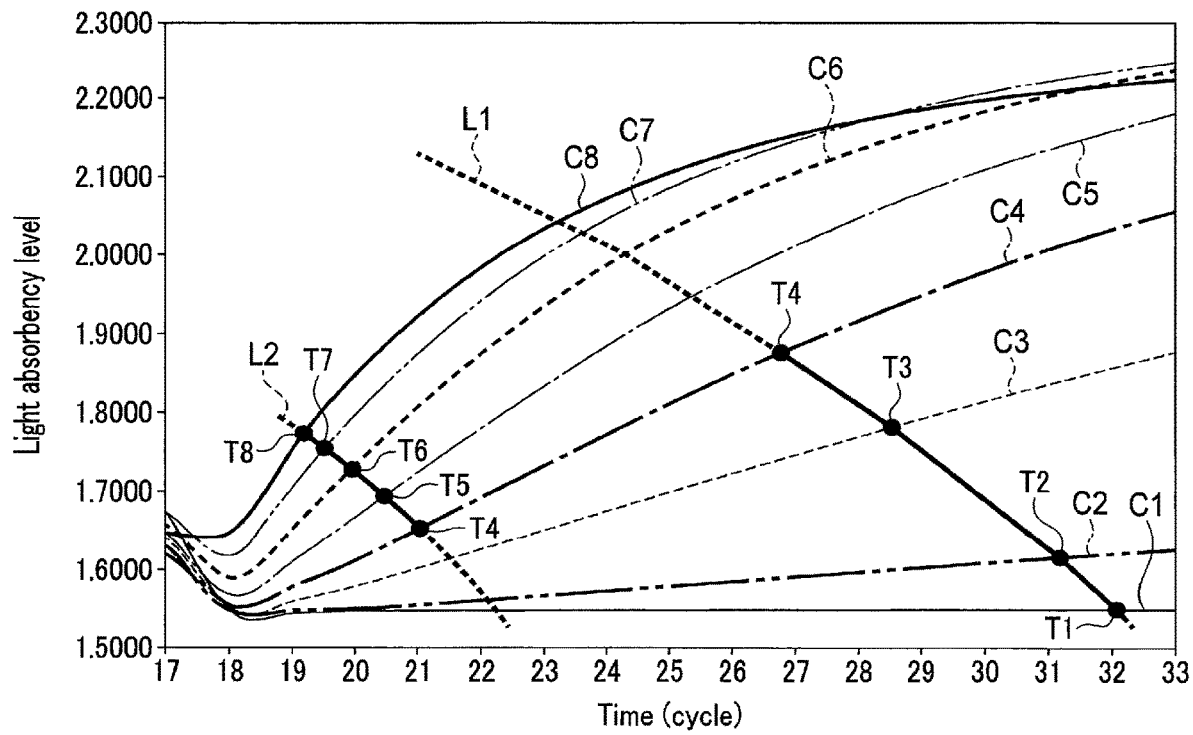
FIG. 9 is a diagram showing photometry timing lines and photometry timings, in the instance of setting two photometry timing lines.

Note that the number of photometry timing lines set in the present embodiment is not limited to a single photometry timing line as shown in FIGS. 5 to 7. More than one photometry timing line may be set according to the concentrations in standard samples. For example, as shown in FIG. 9, two photometry timing lines L1 and L2 may be set. In this instance, photometry timings T1 to T3 for the low-concentration standard samples S1 to S3 are set at the respective intersections between the photometry timing line L1 and the reaction curves C1 to C3 for the standard samples S1 to S3. Also, photometry timings T4 to T8 for the middle to high-concentration standard samples S4 to S8 are set at the respective intersections between the photometry timing line L2 and the reaction curves C4 to C8 for the standard samples S4 to S8. Additionally, in the example shown in FIG. 9, the frequency of emitted light may be differentiated when dealing with the low concentration zones and the high concentration zones.

Figure 10:
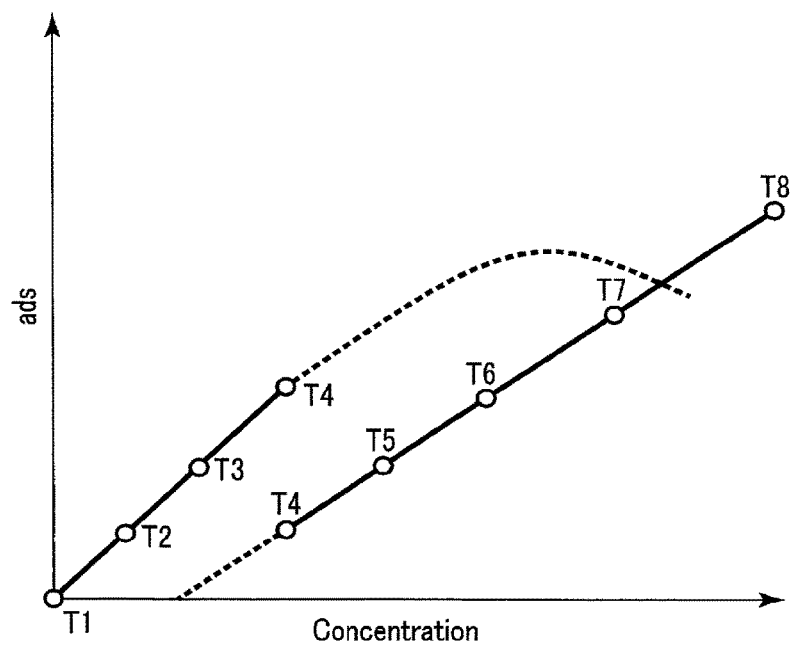
FIG. 10 is a diagram showing standard calibration curves generated based on the photometry timings in FIG. 9.

FIG. 10 is a diagram showing, by way of example, the standard calibration curves generated based on the photometry timings shown in FIG. 9. The standard calibration curves in FIG. 10 are indicative of the correlation between concentrations and light absorbance levels. The light absorbance levels given in FIG. 10 are calculated from, for example, the differences between the light absorbance levels at a cycle in the initial stage, where the reactions within the reaction liquids are yet to be apparent, and the corresponding light absorbance levels measured at the respective photometry timings T1 to T8 shown in FIG. 9. As understood from FIG. 10, the standard calibration curves are generated, showing light absorbance levels for the respective concentration zones of the detection targets, where a higher light absorbance level is associated with the detection target contained in a higher concentration. Therefore, it is possible to uniquely specify the concentration of each detection target from the light absorbance levels by referring to the standard calibration curve for the middle to high concentration zones in the case of short-cycle measurement and by referring to the standard calibration curve for the low concentration zones in the case of long-cycle measurement.

The embodiment has been described assuming the instances where the photometry timing line and the photometry timings are set based on the results of measurement using the eight standard samples S1 to S8, but this is not a limitation. The number of standard samples for use may be less, for example, six or so.

According to the first embodiment as described above, each of the standard samples S1 to S8 is dispensed with a reagent containing insoluble carriers to which the ingredients to be bonded to the detection target in the sample are attached. The reaction liquids containing the dispensed reagent and the respective standard samples S1 to S8 are subjected to optical measurement at different photometry timings. Then, based on such photometry results for the respective standard samples, a calibration curve, i.e., a standard calibration curve, is generated. In this manner, calibration curves can be generated using the photometry results acquired at different photometry timings for different concentrations.

Also, according to the first embodiment, the photometry timings are set to be gradually delayed as the object turns from a high-concentration standard sample to a low-concentration standard sample. Therefore, the calibration curves are generated using the photometry results that have been acquired at earlier timings for higher concentrations.

Furthermore, according to the first embodiment, intensity curves indicative of the time course of the photometric intensities are calculated for the respective standard samples. Based on the intensity curves for the respective standard samples, the photometry timing line is set so that the time points for acquiring information are gradually delayed as the object turns from a high-concentration standard sample to a low-concentration standard sample. Then, the points of intersection between the photometry timing line and the intensity curves of the respective standard samples are adopted as the photometry timings. Therefore, the embodiment allows for the acquisition of information for generating the calibration curves at the optimal reaction times for the respective concentrations of the detection target.

(To Generate Calibration Data by the Automatic Analyzing Apparatus 1)

Next, exemplary operations for generating calibration data, performed by the automatic analyzing apparatus 1 designed as above, will be described in detail.

First, the automatic analyzing apparatus 1 acquires calibration curve information for the second reagent received in a lot unit via, for example, a network. The calibration curve information contains data for the standard calibration curve and data for the photometry timing line, for the second reagent received in a lot unit. The acquired calibration curve information is stored in the storage circuitry 8.

The control circuitry 9 performs the calibration control function 92 at, for example, the activation of the automatic analyzing apparatus 1. With the calibration control function 92, the control circuitry 9 controls the analysis mechanism 2 and the drive mechanism 4 to generate the standard data for a given test assay. More specifically, and for example, the reagent racks 2041 in the first-reagent carousel 204 are rotated so that the opening of the container containing at least one of the standard samples S1 to S8, held at the reagent racks 2041, is positioned at the first-reagent aspiration position. The standard sample in the container is aspirated by the first-reagent dispensing probe 209. The aspirated standard sample is dispensed to the reaction container 2011.

Subsequently, the reagent racks 2041 are rotated so that the opening of the reagent container containing the first reagent, held at the reagent racks 2041, is positioned at the first-reagent aspiration position. The first reagent in the reagent container is aspirated by the first-reagent dispensing probe 209. The aspirated first reagent is dispensed to the reaction container 2011 to which the standard sample has been dispensed. The reaction container 2011 containing the dispensed standard sample and first reagent is conveyed to the first stirring position by the reaction disk 201. The solution of the standard sample and the dispensed first reagent is stirred by the first stirring unit 212, and subjected to incubation for a predetermined period at a predetermined temperature.

Next, the reagent racks 2051 in the second-reagent carousel 205 are rotated so that the opening of the reagent container containing the second reagent, held at the reagent racks 2051, is positioned at the second-reagent aspiration position. The second reagent in the reagent container is aspirated by the second-reagent dispensing probe 211. The aspirated second reagent is dispensed to the mixture liquid of the standard sample and the first reagent. The reaction container 2011 containing the dispensed standard sample, first reagent, and second reagent is conveyed to the second stirring position by the reaction disk 201. The solution of the standard sample and the dispensed first reagent and second reagent is stirred by the second stirring unit 213.

After the stirring by the second stirring unit 213, the reaction container 2011 is conveyed to the photometry point by the reaction disk 201. The light source of the photometry unit 214 emits light to the reaction container 2011 having been conveyed to the photometry point. The photodetector of the photometry unit 214 detects the light transmitted through the reaction container 2011. Based on the intensity of the detected light, the standard data indicating a light absorbance level is generated. The generated standard data is output to the analysis circuitry 3. The measurement by the photometry unit 214 is repeated a predetermined number of times at a preset cycle, so that the set of generated standard data is supplied to the analysis circuitry 3. Note that the number of standard samples used for generating the standard data is not limited to one. For example, two standard samples may be used. In this case, the standard samples S2 and S5 may be used, for example.

The analysis circuitry 3 performs the calibration data generation function 31 upon receipt of the standard data from the analysis mechanism 2. With the calibration data generation function 31, the analysis circuitry 3 reads the data for the standard calibration curve and the data for the photometry timing line, relating to the second reagent for the given test assay, from the storage circuitry 8. The analysis circuitry 3 calculates the reaction curve by drawing an approximation curve based on the measurement values contained in the standard data for the standard sample. The analysis circuitry 3 calculates the light absorbance level corresponding to the photometry timing as the intersection between the reaction curve and the photometry timing line (corresponding to the photometry timings T2 and T5 when the standard samples S2 and S5 are used).

The analysis circuitry 3 corrects and/or performs interpolation for the standard calibration curve based on the light absorbance level corresponding to the photometry timing, thereby obtaining a calibration curve that allows for the measurement of subject data for the test item. The analysis circuitry 3 then sends the calibration curve after correction, etc. to the storage circuitry 8 to store as, for example, calibration data. As a method for obtaining the calibration curve by correcting the standard calibration curve based on the standard data acquired from the measurement of at least one standard sample, any generally available method may be adopted to economical use of reagents, etc. However, this does not pose a limitation. The analysis circuitry 3 may obtain the calibration curve without the standard calibration curve.

More specifically, and for example, all the standard samples S1 to S8 may be measured to generate the standard data indicating light absorbance levels. The analysis circuitry 3 performs the calibration data generation function 31 upon receipt of the standard data from the analysis mechanism 2. With the calibration data generation function 31, the analysis circuitry 3 reads the data for the photometry timing line, relating to the second reagent for a given test item, from the storage circuitry 8. The analysis circuitry 3 calculates the reaction curves by drawing respective approximation curves based on the measurement values contained in the standard data for the standard samples. The analysis circuitry 3 calculates the light absorbance level corresponding to each photometry timing as the intersection between the reaction curve and the photometry timing line. The analysis circuitry 3 obtains a calibration curve based on the light absorbance levels corresponding to the photometry timings. The analysis circuitry 3 sends the calibration curve to the storage circuitry 8 to store as, for example, calibration data. In this manner, a calibration curve that more accurately accords with the present conditions can be obtained.

As described, according to the first embodiment, the automatic analyzing apparatus 1 is adapted to add a reagent containing insoluble carriers, to which the ingredients to be bonded to a detection target in the standard sample are attached, to at least one of the standard samples S1 to S8 by using the first-reagent dispensing probe 209. The photometry unit 214 acquires the photometric intensity for the standard sample by optically measuring the reaction liquid of the standard sample dispensed with the reagent. The storage circuitry 8 stores the photometry timing line that is set so that the time points for acquiring information for the photometric intensity are gradually delayed as the object turns from a high-concentration standard sample to a low-concentration standard sample. Based on the acquired photometric intensities, the analysis circuitry 3 with the calibration data generation function 31 obtains the intensity curve indicative of the time course of the photometric intensities, and the analysis circuitry 3 then generates the calibration data based on information acquired at the intersection between the intensity curve and the photometry timing line. Therefore, by acquiring information at the reaction time optimal for the concentration of the detection target, the automatic analyzing apparatus 1 can generate the calibration data of wide dynamic range.

(To Generate Analysis Data by the Automatic Analyzing Apparatus 1)

Next, exemplary operations for generating analysis data, performed by the automatic analyzing apparatus 1, will be described in detail.

The control circuitry 9 performs the measurement control function 93 upon, for example, receipt of an input of instruction from an operator to start a measurement operation. With the measurement control function 93, the control circuitry 9 controls the analysis mechanism 2 and the drive mechanism 4 to generate subject data for a given test item.

The analysis circuitry 3 performs the analysis data generation function 32 upon receipt of the subject data from the analysis mechanism 2. With the analysis data generation function 32, the analysis circuitry 3 reads the calibration data and the data for the photometry timing line, stored for the test item corresponding to the subject data, from the storage circuitry 8. The analysis circuitry 3 calculates a subject data approximation curve by drawing an approximation curve based on the light absorbance levels actually measured and contained in the subject data. Note that the subject data approximation curve is not limited to the approximation curve calculated based on the light absorbance levels, but may be a straight line obtained by performing linear interpolation between the light absorbance levels. Although an approximation formula of high accuracy is required, the case of adopting an approximation curve would be more robust to noise than the case of adopting a straight line.

FIG. 11 is a diagram showing an example of the subject data approximation curve that is calculated based on the reaction curves C1 to C8 for the standard samples S1 to S8, the photometry timing line, and the subject data. In FIG. 11, the subject data approximation curve is shown as a bold two-dot chain line, which intersects with the photometry timing line between the photometry timings T4 and T5.

In order to give a concentration value of the detection target within the sample based on the subject data, it is necessary to obtain the position of the intersection between the photometry timing line and the subject data approximation curve, and substitute this position for the position on the calibration data. The analysis circuitry 3, for example, performs the following processing to specify the position on the calibration data.

FIG. 12 is a diagram showing an example of the corrected calibration data stored in the storage circuitry 8. First, the analysis circuitry 3 connects the points T4 and T5 on the photometry timing line shown in FIG. 11, by a straight line. It will be supposed that the point of intersection between the photometry timing line and the subject data approximation curve is X, and a line-segment ratio is given as T4X:XT5=a: b. Through calculation, the analysis circuitry 3 identifies a point that divides the segment T4T5 in the ratio of a:b, on the corrected calibration data for the test item corresponding to the subject data. This point represents the intersection point X, i.e., the position on the calibration data substituted by the intersection point on the photometry timing line. FIG. 12 shows a vertical line extending from the point X toward the x-axis. The value at the intersection between this vertical line and the x-axis is the concentration of the detection target in the sample.

According to the first embodiment as described, the automatic analyzing apparatus 1 is adapted to add a reagent containing insoluble carriers, to which prescribed ingredients are attached, to the subject sample by using the first-reagent dispensing probe 209. The photometry unit 214 acquires the photometric intensity for the subject sample by optically measuring the reaction liquid of the subject sample added with the reagent. Based on the acquired photometric intensities for the subject sample, the analysis circuitry 3 with the analysis data generation function 32 obtains the intensity curve indicative of the time course of the photometric intensities, and the analysis circuitry 3 then generates the analysis data based on information acquired at the intersection between the intensity curve and the photometry timing line, and the calibration data. Therefore, the automatic analyzing apparatus 1 can generate the analysis data utilizing the calibration data of wide dynamic range.

Second Embodiment

The description has been given of the first embodiment, assuming that the standard calibration curve and the calibration curve are indicative of the correlation between concentrations and light absorbance levels, for example. The second embodiment will now be described, assuming that the standard calibration curve and the calibration curve are indicative of the correlation between concentrations and reaction times.

(To Set the Standard Calibration Curve, Photometry Timing Line, and Photometry Timings)

The standard calibration curve in the second embodiment may indicate the correlation between concentrations and reaction times. The standard calibration curve is generated at, for example, a reagent manufacturer, etc., based on the reaction times up to the photometry timings set for the respective reaction curves C1 to C8.

More specifically, and for example, supposing that the photometry timing line is curved as shown in FIG. 6, the reaction times elapsed before reaching the respective photometry timings T1 to T8 are given as shown in FIG. 13. In this instance, the standard calibration curve is calculated with the acquired reaction times on the vertical axis and the concentrations on the horizontal axis. FIG. 14 is a diagram showing an example of the standard calibration curve calculated based on FIG. 13 and represented by the concentrations and the reaction times. It can be seen from the standard calibration curve shown in FIG. 14 that when the concentration of a detection target is high, the reaction time is short.

Note that the second embodiment does not limit the photometry timings stipulated by the photometry timing line in such a manner that they are set within the maximum number of measurement cycles. That is, the photometry timings may be set to be the time after, for example, the 33rd cycle.

In this instance, for example, the reaction curves in the area beyond the maximum number of measurement cycles are estimated from at least some of the time courses (reaction curves) for the standard samples. The photometry timing line is then set based on the reaction curves and the estimated reaction curves.

More specifically, an example case will be assumed, where the reaction curves C1 to C8 for the standard samples S1 to S8 shown in FIG. 4 are used. For each of the reaction curves C1 to C8, a linear regression analysis using, for example, an observation interval which involves four points at the 30th to 33rd cycles is performed. However, any intervals may be used for the linear regression analyses, and can be discretionarily selected by a user or a reagent manufacturer.

From among the approximation (straight) lines calculated in the linear regression analyses, the approximation lines having a determination coefficient of, e.g., 0.5 or greater are selected. This is because, when the determination coefficient of the approximation line calculated based on the four observation-interval points at the 30th to 33rd cycles is a negative value, or a value of 0.5 or below, curve approximation would be more suitable than the straight-line approximation. The selected approximation lines are indicative of the reactions after the 33rd cycle, for the respective corresponding reaction curves. For the reaction curves for which an approximation line having a determination coefficient of 0.5 or below has been calculated, the reactions after the 33rd cycle are not taken into consideration.

For example, a data set is prepared by extracting a single measurement value from each of the reaction curves C1 to C8 that extend into an area after the 33rd cycle, and using the data set, a regression analysis is performed with a light absorbance level as the objective variable. The regression analysis is repeated while changing the measurement values to extract, and regression equations satisfying predetermined conditions are selected from the calculated multiple regression equations. Subsequently, for each of the selected regression equations, points of intersection with the respective reaction curves C1 to C8 are obtained and a sum, or a product, etc., of the differences in light absorbance level between the neighboring intersection points is calculated. Then, from among the selected regression equations, the one having the greatest sum value, or the greatest product value, etc., is adopted as the photometry timing line.

FIG. 15 is a diagram showing, by way of example, the photometry timing line and the photometry timings, set based on the reaction curves C1 to C8 extending into an area after the 33rd cycle. In FIG. 15, the photometry timing line is shown as a bold broken line, which is curved. FIG. 15 shows the photometry timings as dot marks. In FIG. 15, the approximation lines calculated for the respective reaction curves C1 to C4 indicate the reactions after the 33rd cycle. It is shown that the photometry timing line and the reaction curves C1 to C4 intersect in the area after the 33rd cycle. In other words, the photometry timings T1 to T3 for the standard samples S1 to S3 occur in the area after the 33rd cycle. The standard calibration curve is generated based on the reaction times up to the photometry timings T1 to T8 shown in FIG. 15.

FIG. 16 is a diagram showing an example of the standard calibration curve generated based on the photometry timings shown in FIG. 15. It can be seen from the standard calibration curve shown in FIG. 16 that when the concentration of a detection target is high, the reaction time is short.

For the reaction curves for which an approximation line having a determination coefficient of 0.5 or below has been calculated, an approximation curve may be additionally calculated based on the four observation-interval points at the 30th to 33rd cycles so that the reactions after the 33rd cycle are given by the calculated approximation curves. Also, the threshold of the determination coefficients for selecting the approximation lines is not limited to 0.5. Such a threshold may be discretionarily set.

Moreover, when to set the photometry timing line is not limited to the time subsequent to completion of the calculation of the reaction curves for the area after the 33rd cycle. The photometry timing line may be set, e.g., in advance of calculating the reaction curves for the area after the 33rd cycle. For example, a point (reaction time) that yields a given value of the light absorbance level may be determined as a point to be adopted on the standard calibration curve, for each of the reaction curves. Based on the determined points, the photometry timing line is set.

In this case, whether or not the reaction curves for the area after the 33rd cycle should be calculated can be determined based on the set photometry timing line. For example, if no intersection between the set photometry timing line and the reaction curve appears within 33 cycles, the calculation of the reaction curve for the area after the 33rd cycle is deemed to be necessary. Upon deeming that the reaction curve for the area after the 33rd cycle should be calculated, a regression analysis is performed using the measurement values from the predetermined interval on the reaction curve, thereby calculating the reaction curve for the area after the 33rd cycle.

In the second embodiment, furthermore, the photometry timing line may not necessarily extend obliquely from the lower right toward the upper left. The photometry timing line may be, for example, a straight line extending in parallel with the horizontal axis.

Figure 17:
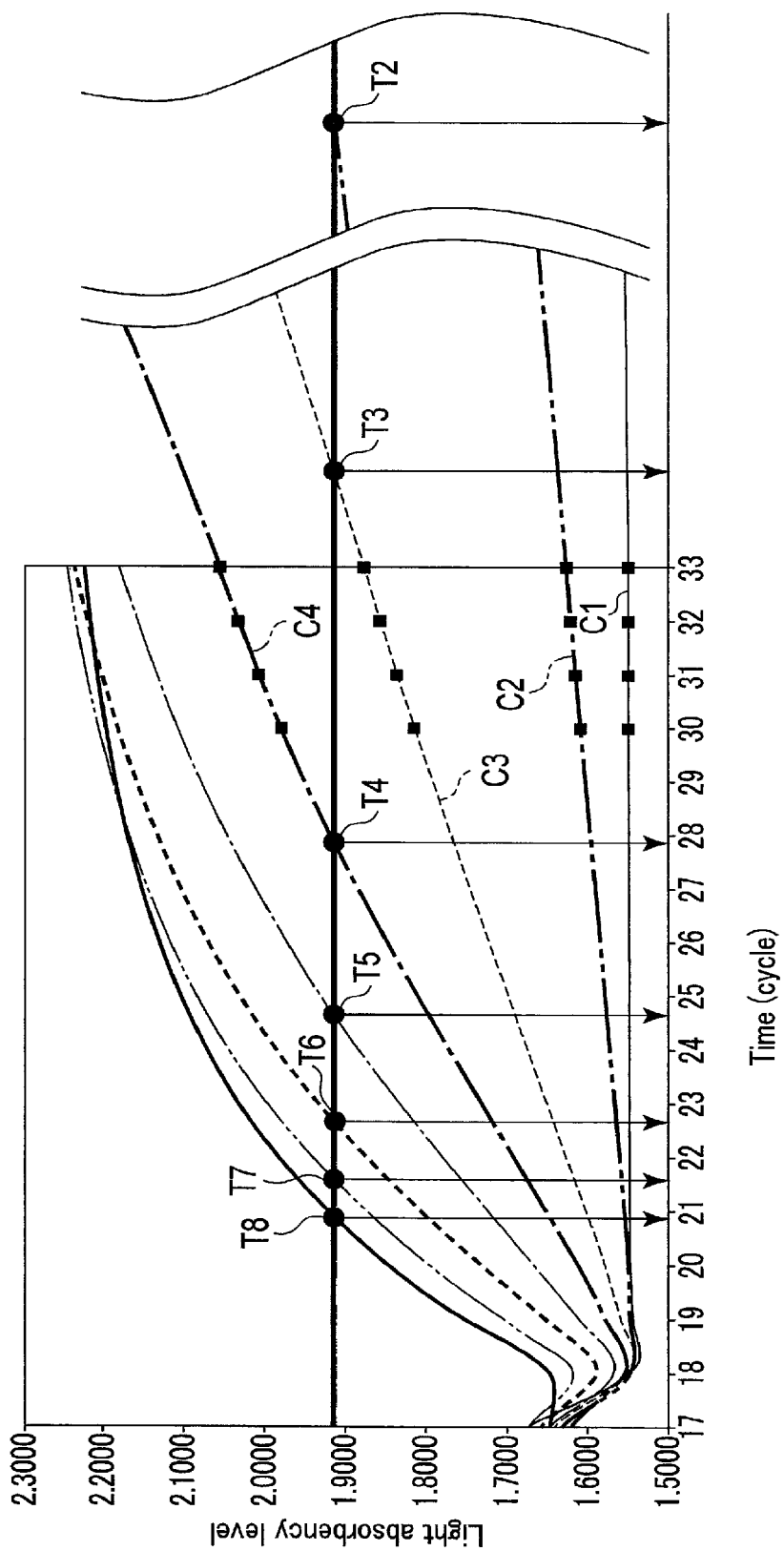
FIG. 17 is a diagram for describing yet another exemplary method for obtaining a standard calibration curve.

In one example, the photometry timing line is set as a straight line indicative of a constant light absorbance level. FIG. 17 shows, by way of example, the photometry timing line indicating a fixed light absorbance level, and the photometry timings. FIG. 17 shows the photometry timing line as a bold broken line, and the photometry timings as dot marks. In FIG. 17, the approximation lines calculated for the respective reaction curves C1 to C4 indicate the reactions after the 33rd cycle. It is shown that the photometry timing line and the reaction curves C2 and C3 intersect in the area after the 33rd cycle. Just a note, the reaction curve C2 is angled to a certain extent with respect to the horizontal axis, and as such, the reaction curve C2 consequently intersects with the photometry timing line when the reaction curve C2 extends. Accordingly, the photometry timings T2 and T3 for the standard samples S2 and S3 occur in the area after the 33rd cycle. The standard calibration curve is generated based on the reaction times up to the photometry timings T2 to T8 shown in FIG. 17.

FIG. 18 is a diagram showing an example of the standard calibration curve generated based on the photometry timings shown in FIG. 17. With the standard calibration curve shown in FIG. 18, in which a steep inclination appears at the low concentration zone, the resolution in concentration calculations can be enhanced.

According to the second embodiment as described above, each of the standard samples S1 to S8 is added with a reagent containing insoluble carriers to which the ingredients to be bonded to the detection target in the sample are attached. The reaction liquids containing the added reagent and the respective standard samples S1 to S8 are subjected to optical measurement at different photometry timings. Then, based on the photometry results for the respective standard samples, a calibration curve is generated from the reaction times up to given light absorbance levels. Therefore, in either case of a high or a low concentration, the concentration of a detection target can be uniquely specified from the reaction time up to the given light absorbance level.

Note that the standard calibration curve may be represented by a combination of the correlation between concentrations and light absorbance levels, and the correlation between concentrations and reaction times. For example, the standard calibration curve is represented by the correlation between concentrations and light absorbance levels when the detection targets are contained in low concentrations, and represented by the correlation between concentrations and reaction times when the detection targets are contained in middle to high concentrations. More specifically, and for example, for the standard samples of middle to high concentrations, the reaction times elapsed before reaching the respective photometry timings T5 to T8 are acquired, as shown in FIG. 19. Then, based on the acquired reaction times, a standard calibration curve is generated for the samples containing the detection target in middle to high concentrations. Also, for the standard samples of low concentrations, the light absorbance levels are calculated from the differences between the light absorbance levels at a cycle in the initial stage, where the reactions within the reaction liquids are yet to be apparent, and the corresponding light absorbance levels measured at the respective photometry timings T1 to T5 shown in FIG. 19. Then, based on the calculated light absorbance levels, a standard calibration curve is generated for the samples containing the detection target in low concentrations.

Figure 21:
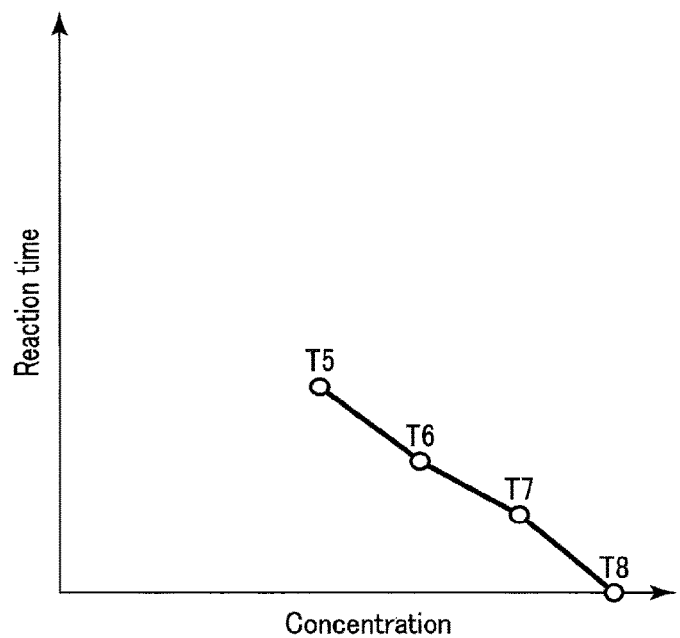
FIG. 21 is a diagram showing part of the standard calibration curve obtained by the method described with reference to FIG. 19.

FIG. 20 and FIG. 21 are diagrams each showing an example of the standard calibration curve generated by the method described with reference to FIG. 19. The standard calibration curve shown in FIG. 20 is represented by the correlation between concentrations and light absorbance levels, and used for the measurement of detection targets contained in low concentrations. The standard calibration curve shown in FIG. 21 is represented by the correlation between concentrations and reaction times, and used for the measurement of detection targets contained in middle to high concentrations. Therefore, for the measurement of a detection target contained in low concentrations, the concentration of the detection target can be specified based on the light absorbance level. Also, for the measurement of a detection target contained in middle to high concentrations, the concentration of the detection target can be specified based on the reaction time up to the given light absorbance level. That is, in either case of a high or a low concentration, the concentration of a detection target can be uniquely specified.

(To Generate Calibration Data by the Automatic Analyzing Apparatus 1)

Next, exemplary operations for generating calibration data, performed by the automatic analyzing apparatus 1, will be described.

First, the analysis mechanism 2 generates standard data for at least one of the standard samples S1 to S8 for a given test item. When the standard data is generated, the analysis circuitry 3 performs the calibration data generation function 31. With the calibration data generation function 31, the analysis circuitry 3 reads the data for the standard calibration curve and the data for the photometry timing line, relating to the given test item, from the storage circuitry 8. The analysis circuitry 3 calculates the reaction curve by drawing an approximation curve based on the measurement values contained in the standard data for the standard sample.

The analysis circuitry 3 determines whether or not the point of intersection between the photometry timing line and the reaction curve is present within the maximum number of measurement cycles, e.g., 33 cycles. When the whole photometry timing line is covered by 33 cycles as shown in FIG. 13, the photometry timing line and the reaction curve always intersect with each other on or before the 33rd cycle. The analysis circuitry 3 calculates the reaction time elapsed before reaching the photometry timing as the intersection point between the reaction curve and the photometry timing line. The analysis circuitry 3 corrects and/or performs interpolation for the standard calibration curve set as shown in, for example, FIG. 14, based on the reaction time up to the photometry timing. In this manner, a calibration curve that allows for the measurement of subject data for the given test item is obtained. The analysis circuitry 3 then sends the calibration curve after correction, etc. to the storage circuitry 8 to store as, for example, calibration data.

When the photometry timing line does not fit within 33 cycles as shown in FIG. 15, the intersection with the photometry timing line is present at the cycle after the 33rd cycle, depending on the reaction curve calculated. If the intersection point between the photometry timing line and the reaction curve is not present within 33 cycles, the analysis circuitry 3 performs, for example, linear regression analysis based on the four observation-interval points at the 30th to 33rd cycles, for the calculated reaction curve. The analysis circuitry 3 extends the reaction curve using the approximation line calculated by the linear regression analysis. The analysis circuitry 3 calculates the reaction time up to the photometry timing as the intersection point between the reaction curve extending beyond the 33rd cycle and the photometry timing line.

Note that for the reaction curves that do not allow linear regression analysis to calculate an approximation line having a predetermined determination coefficient or greater, the photometry timing line may be set in advance so that such reaction curves and the photometry timing line intersect on or before the 33rd cycle. In this way, the accuracy in calculation of the reaction times can be further enhanced.

The analysis circuitry 3 corrects and/or performs interpolation for the standard calibration curve set as shown in, for example, FIG. 16, based on the reaction time up to the photometry timing. In this manner, a calibration curve that allows for the measurement of subject data for the given test item is obtained. The analysis circuitry 3 then sends the calibration curve after correction, etc. to the storage circuitry 8 to store as, for example, calibration data.

The method for obtaining the calibration curve is not limited to the foregoing descriptions. The analysis circuitry 3 may obtain the calibration curve without the standard calibration curve.

More specifically, and for example, all the standard samples S1 to S8 may be measured to generate the standard data indicating light absorbance levels. The analysis circuitry 3 calculates the reaction curves by drawing respective approximation curves based on the measurement values contained in the standard data for the standard samples S1 to S8. The analysis circuitry 3 calculates reaction times elapsed before reaching the respective photometry timings T1 to T8, as the intersection points between the reaction curves and the photometry timing line. The analysis circuitry 3 obtains a calibration curve based on the reaction times up to the respective photometry timings T1 to T8. The analysis circuitry 3 sends the calibration curve to the storage circuitry 8 to store as, for example, calibration data.

According to the second embodiment as described above, the automatic analyzing apparatus 1 utilizes the calibration data generation function 31 of the analysis circuitry 3 to obtain, based on acquired photometric intensities, the intensity curve indicative of the time course of these photometric intensities, and to then generate the calibration data based on the reaction time up to the intersection between the intensity curve and the photometry timing line. Therefore, the automatic analyzing apparatus 1 can generate the calibration data of wide dynamic range.

(To Generate Analysis Data by the Automatic Analyzing Apparatus 1)

Next, exemplary operations for generating analysis data, performed by the automatic analyzing apparatus 1, will be described.

Upon start of the measurement operation, subject data for a given test item is generated by the analysis mechanism 2. The analysis circuitry 3 performs the analysis data generation function 32 upon receipt of the subject data from the analysis mechanism 2. With the analysis data generation function 32, the analysis circuitry 3 reads the calibration data and the data for the photometry timing line, stored for the test item corresponding to the subject data, from the storage circuitry 8. The analysis circuitry 3 calculates a subject data approximation curve by drawing an approximation curve based on the light absorbance levels actually measured and contained in the subject data.

Figure 22:
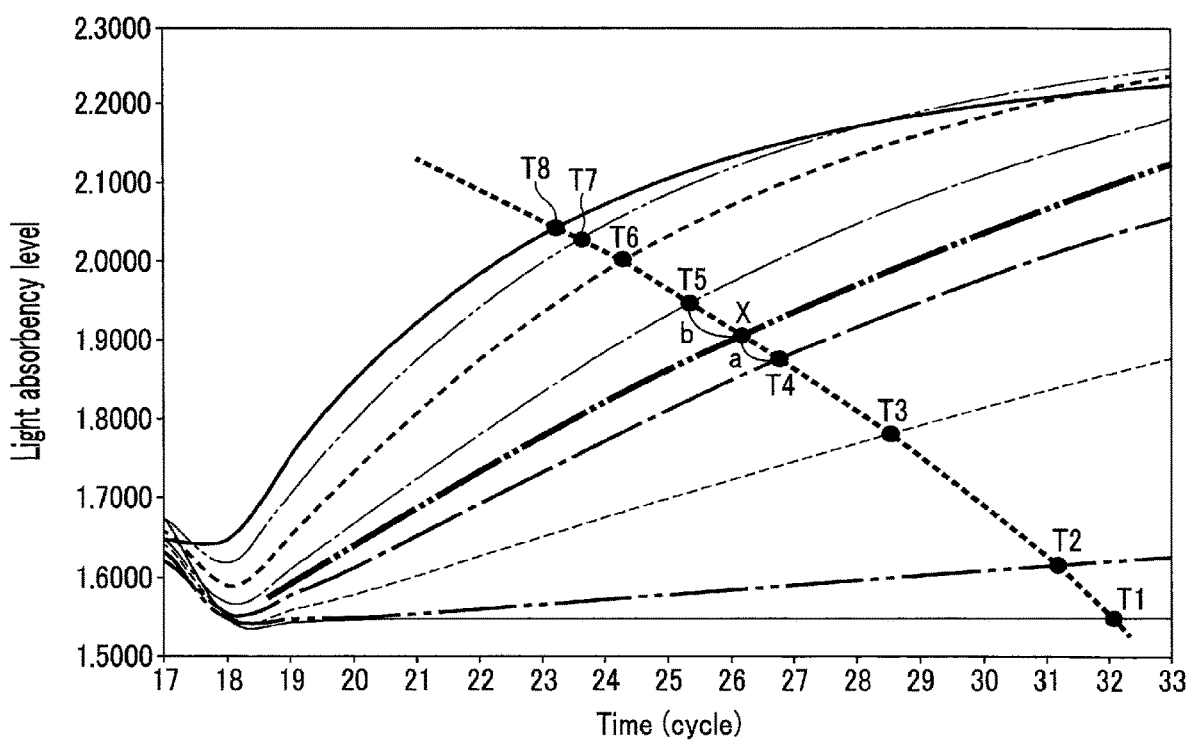
FIG. 22 is a diagram showing reaction curves, a photometry timing line, and a subject data approximation curve.

The analysis circuitry 3 determines whether the point of intersection between the photometry timing line and each reaction curve is present within the maximum number of measurement cycles, e.g., 33 cycles. FIG. 22 is a diagram showing an example of the subject data approximation curve calculated based on the reaction curves C1 to C8 for the standard samples 81 to S8, the photometry timing line, and the subject data. In FIG. 22, the subject data approximation curve is shown as a bold two-dot chain line, and the photometry timing line intersects with the reaction curves before the 33rd cycle.

Figure 23:
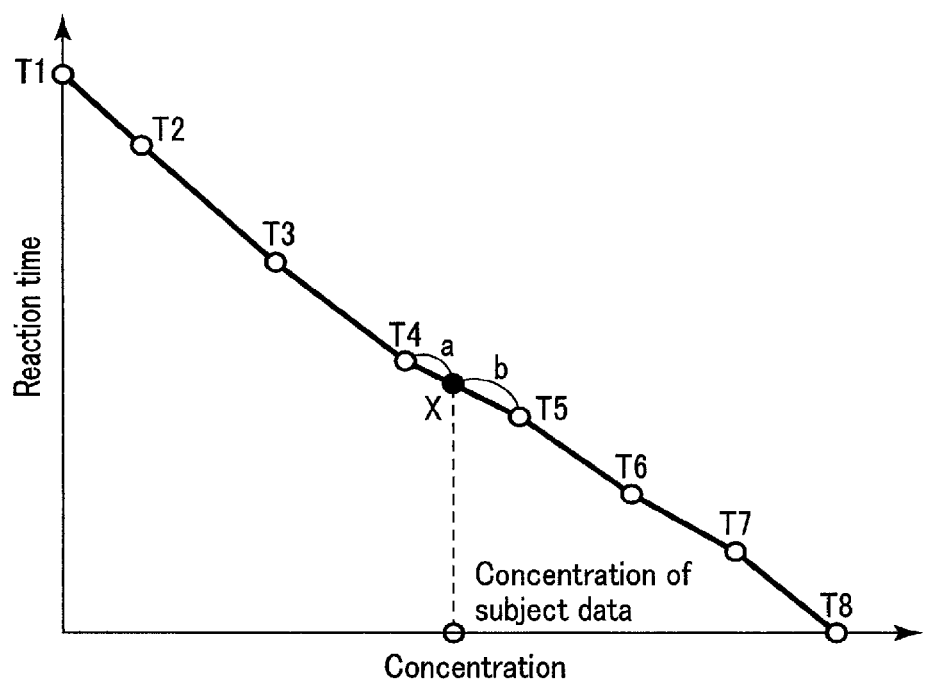
FIG. 23 is a diagram showing corrected calibration data corresponding to FIG. 22.

In the case where the intersection point between the photometry timing line and the reaction curve is covered within 33 cycles, the analysis circuitry 3 generates analysis data using the photometry timings close to the intersection point, for example, the photometry timings T4 and T5. For example, the analysis circuitry 3 connects the points T4 and T5 on the photometry timing line shown in FIG. 22, by a straight line. Here, it will be supposed that the point of intersection between the photometry timing line and the subject data approximation curve is X, and a line-segment ratio is given as T4X:XT5=a:b. Through calculation, the analysis circuitry 3 identifies a point that divides the segment T4T5 in the ratio of a:b, on the corrected calibration data for the test assay corresponding to the subject data. This point represents the intersection point X, i.e., the position on the calibration data substituted by the intersection point on the photometry timing line. FIG. 23 is a diagram showing, by way of example, corrected calibration data related to FIG. 22 and the calculated point X. FIG. 23 shows a vertical line extending from the point X toward the x-axis. The value at the intersection between this vertical line and the x-axis is the concentration of the detection target in the sample.

Figure 24:
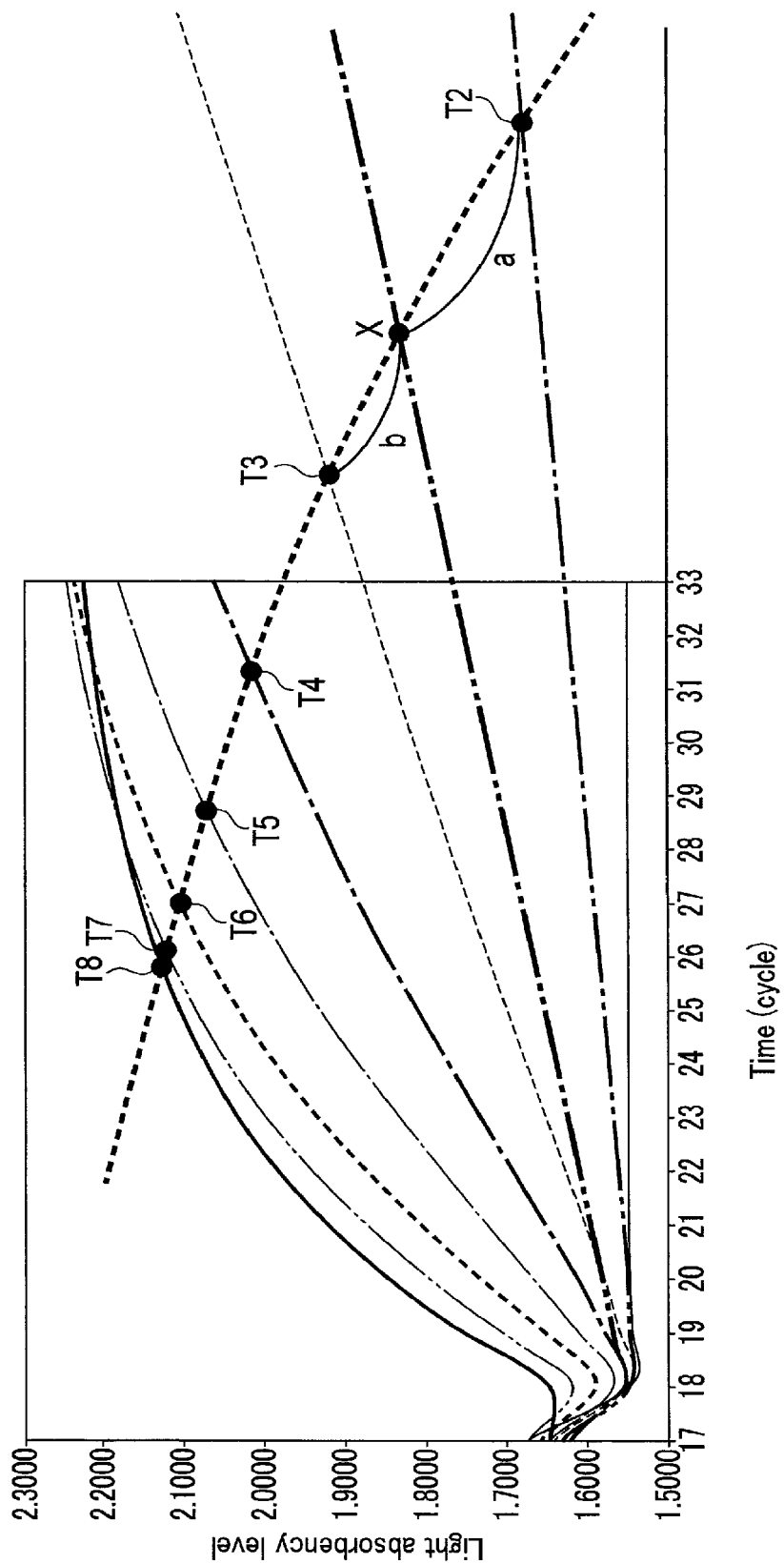
FIG. 24 is a diagram showing reaction curves, a photometry timing line, and a subject data approximation curve.

When the photometry timing line does not fit within 33 cycles as shown in FIG. 24, the intersection with the photometry timing line is present at the cycle after the 33rd cycle, depending on the subject data approximation curve. If the intersection point between the photometry timing line and the subject data approximation curve is not present within 33 cycles, the analysis circuitry 3 performs, for example, linear regression analysis based on the four observation-interval points at the 30th to 33rd cycles, for the calculated subject data approximation curve. The analysis circuitry 3 extends the subject data approximation curve using the approximation line calculated by the linear regression analysis. The analysis circuitry 3 obtains the intersection point X between the subject data approximation curve extending beyond the 33rd cycle and the photometry timing line.

The analysis circuitry 3 generates analysis data using the photometry timings close to the intersection point, for example, the photometry timings T2 and T3. For example, the analysis circuitry 3 connects the points T2 and T3 on the photometry timing line shown in FIG. 24, by a straight line. Here, a line-segment ratio is supposed to be given as T2X:XT3=a:b. Through calculation, the analysis circuitry 3 finds out a point X that divides the segment T2T3 in the ratio of a:b, on the corrected calibration data for the test assay corresponding to the subject data. This point X corresponds to the intersection point X on the photometry timing line. FIG. 25 is a diagram showing, by way of example, corrected calibration data related to FIG. 24 and the calculated point X. FIG. 25 shows a vertical line extending from the point X toward the x-axis. The value at the intersection between this vertical line and the x-axis is the concentration of the detection target in the sample.

Note that the method for obtaining the concentration of a detection target in the sample is not limited to the foregoing descriptions. For example, the analysis circuitry 3 may calculate the reaction time up to the intersection point X between the photometry timing line and the subject data approximation curve. The analysis circuitry 3 then checks the calculated reaction time against the corrected calibration data shown in, for example, FIG. 23 to obtain the concentration of the detection target in the sample.

Additionally, depending on the concentration of a detection target in the sample, the photometry values could fluctuate during the observation interval, e.g., from the 30th cycle to the 33rd cycle. In such instances, the approximation line calculated by the linear regression analysis based on the four observation-interval points at the 30th to 33rd cycles may not be so accurate. When the degree of fluctuations of the photometry values during the observation interval, e.g., from the 30th cycle to the 33rd cycle, is judged to be a predetermined degree or greater, the analysis circuitry 3 may present an identifier indicative of the low accuracy of the calculated approximation line. The identifier may be, for example, an error flag.

According to the second embodiment as described above, the automatic analyzing apparatus 1 utilizes the analysis data generation function 32 of the analysis circuitry 3 to obtain, based on acquired photometric intensities of the subject sample, the intensity curve indicative of the time course of these photometric intensities. The automatic analyzing apparatus 1 then generates the analysis data based on the reaction time up to the intersection between the obtained intensity curve and the photometry timing line. Incidentally, in the case of specifying the concentration of a detection target based on a calibration curve generated using the light absorbance levels at the respective intersections between the intensity curves and the photometry timing line, the quantification result is often largely influenced by small fluctuations in the measured light absorbance levels. This is especially true when the concentration is low. With respect to this issue, the calibration curve generated using the reaction times up to the respective intersections between the intensity curves and the photometry timing line realizes a high resolution for low concentrations. As such, even though there are small fluctuations in the reaction times at the measurement, it is possible to suppress large variations in the quantification results.

According to at least one of the embodiments described, detection targets can be quantified to the extent of high sensitivity and high concentration ranges, that is, high sensitivity and wide dynamic range properties are realized, for the measurement with insoluble carriers having antigens or antibodies attached thereto.

The term "processor" used in the descriptions of the embodiments refers to, for example, a central processing unit (CPU) or a graphics processing unit (GPU), or various types of circuitry which may be an application-specific integrated circuit (ASIC), a programmable logic device (such as a simple programmable logic device (SPLD), a complex programmable logic device (CPLD), or a field programmable gate array (EPGA)), and so on. The processor reads the programs stored in storage circuitry 8 and executes them to perform the corresponding functions. The programs may be incorporated directly in the circuitry of the processor, instead of being stored in the storage circuitry 8. In this case, the processor reads the programs incorporated in its circuitry and executes them to perform the functions. Each processor described in the embodiments is not limited to a single circuitry-type processor. A plurality of independent processors may be combined and integrated as a single processor having multiple functions. Furthermore, multiple structural elements in the embodiments may be integrated as a single processor having multiple functions.

While certain embodiments have been described, they have been presented by way of example only, and are not intended to limit the scope of the inventions. Indeed, the novel embodiments described herein may be embodied in a variety of other forms. Furthermore, various omissions, substitutions, and changes in the form of the embodiments may be made without departing from the spirit of the inventions. The accompanying claims and their equivalents are intended to cover such forms or modifications as would fall within the scope and the spirit of the inventions.

What is claimed is:

1. An automatic analyzing apparatus comprising:
   a dispensing unit configured to dispense a reagent to each of a plurality of standard samples each containing a detection target in a known concentration, the reagent comprising an insoluble carrier to which an ingredient to be bonded to the detection target is attached;
   a photometry unit configured to obtain photometric intensities for the standard samples by optically measuring each of reaction liquids of the respective standard samples dispensed with the reagent;
   a memory configured to store (a) information for different photometry timings for the standard samples of different detection target concentrations and (b) a photometry timing line indicative of different time points to obtain information for the obtained photometric intensities for the respective standard samples of different detection target concentrations; and
   processing circuitry configured to generate, based on photometry results obtained at the photometry timings, calibration data indicative of a correlation between a reaction time and a concentration, wherein:
   the photometry timings are gradually delayed as a photometry object turns from a higher concentration sample of the standard samples to a lower concentration sample of the standard samples, and
   the processing circuitry is configured to acquire intensity curves based on the obtained photometric intensities and adopt intersections between the intensity curves and the photometry timing line as the photometry timings, the intensity curves each representing a time course of the photometric intensities for the corresponding one of the standard samples wherein the photometry timing line is set by a regression analysis based on the intensity curves.

2. The apparatus according to claim 1, wherein the photometry timing line is set so that the time points to obtain the photometric intensities are gradually delayed as a photometry object turns from the standard sample of a higher concentration to the standard sample of a lower concentration.

3. The apparatus according to claim 1, wherein the processing circuitry is configured to generate the calibration data based on photometric intensities obtained at the photometry timings.

4. The apparatus according to claim 1, wherein the processing circuitry is configured to generate the calibration data based on reaction times for the photometry timings.

5. The apparatus according to claim 1, wherein
   the dispensing unit is configured to dispense the reagent to a subject sample,
   the photometry unit is configured to obtain photometric intensities for the subject sample by optically measuring a reaction liquid of the subject sample dispensed with the reagent, and
   the processing circuitry is configured to acquire an intensity curve for the subject sample, which represents a time course of the photometric intensities for the subject sample, based on the obtained photometric intensities for the subject sample, and to generate analysis data based on information obtained at an intersection between the intensity curve for the subject sample and the photometry timing line and on the calibration data.

* * * * *